(12) United States Patent
Kurokawa et al.

(10) Patent No.: US 7,518,768 B2
(45) Date of Patent: Apr. 14, 2009

(54) IMAGE READING APPARATUS HAVING SUPPORT STRUCTURE

(75) Inventors: Naho Kurokawa, Inagi (JP); Tsuyoshi Yamauchi, Yokohama (JP); Naofumi Sekine, Kawasaki (JP)

(73) Assignee: Canon Kabushiki Kaisha (JP)

( * ) Notice: Subject to any disclaimer, the term of this patent is extended or adjusted under 35 U.S.C. 154(b) by 418 days.

(21) Appl. No.: 11/314,354

(22) Filed: Dec. 21, 2005

(65) Prior Publication Data

US 2006/0139701 A1 Jun. 29, 2006

(30) Foreign Application Priority Data

Dec. 28, 2004 (JP) ............................. 2004-379257

(51) Int. Cl.
*H04N 1/04* (2006.01)
(52) U.S. Cl. .................. 358/497; 358/474; 358/471; 248/469; 248/472; 250/239
(58) Field of Classification Search ............ 358/471, 358/474, 497, 400, 500, 505; 40/745–750, 40/753; 248/469, 472; 399/379, 380, 211, 399/212; 250/234–236, 239, 216; 345/173; 361/683, 686
See application file for complete search history.

(56) References Cited

U.S. PATENT DOCUMENTS 5,480,118 A 1/1996 Cross

| | | | |
|---|---|---|---|
| 5,682,182 A * | 10/1997 | Tsubosaka | .................. 345/173 |
| 6,233,064 B1 | 5/2001 | Griffin | |
| 6,311,940 B1 | 11/2001 | Koshimizu | |
| 2002/0126325 A1 | 9/2002 | Kawasaki et al. | |
| 2003/0076548 A1 | 4/2003 | Cheung et al. | |
| 2004/0228082 A1 | 11/2004 | Tiao | |
| 2006/0139702 A1* | 6/2006 | Kurokawa et al. | .......... 358/474 |
| 2006/0139703 A1* | 6/2006 | Kurokawa et al. | .......... 358/474 |

FOREIGN PATENT DOCUMENTS

| | | |
|---|---|---|
| EP | 0 646 827 A | 4/1995 |
| FR | 2 547 243 A | 12/1984 |
| JP | 2000-156756 A | 6/2000 |

OTHER PUBLICATIONS

Relevant portion of European Search Report of corresponding European Application EP 05028517.0-2202, Apr. 25, 2006.

* cited by examiner

*Primary Examiner*—Cheukfan Lee
(74) *Attorney, Agent, or Firm*—Rossi, Kimms & McDowell, LLP

(57) ABSTRACT

A support structure which can hold an image reading apparatus in a vertically placed condition is provided. On a bottom portion of an apparatus main body 1 in such a horizontally placed condition that a document table glass 2 is installed nearly horizontally, a storage portion 1c for storing the support structure is provided, and support structures 31, 32, 33 are released from the storage portion and get into around the side of a document cover 6 and a hinge 7, from the bottom portion, and holds the apparatus main body 1 in a vertically placed condition.

5 Claims, 36 Drawing Sheets

A—A CROSS-SECTION

F I G. 21
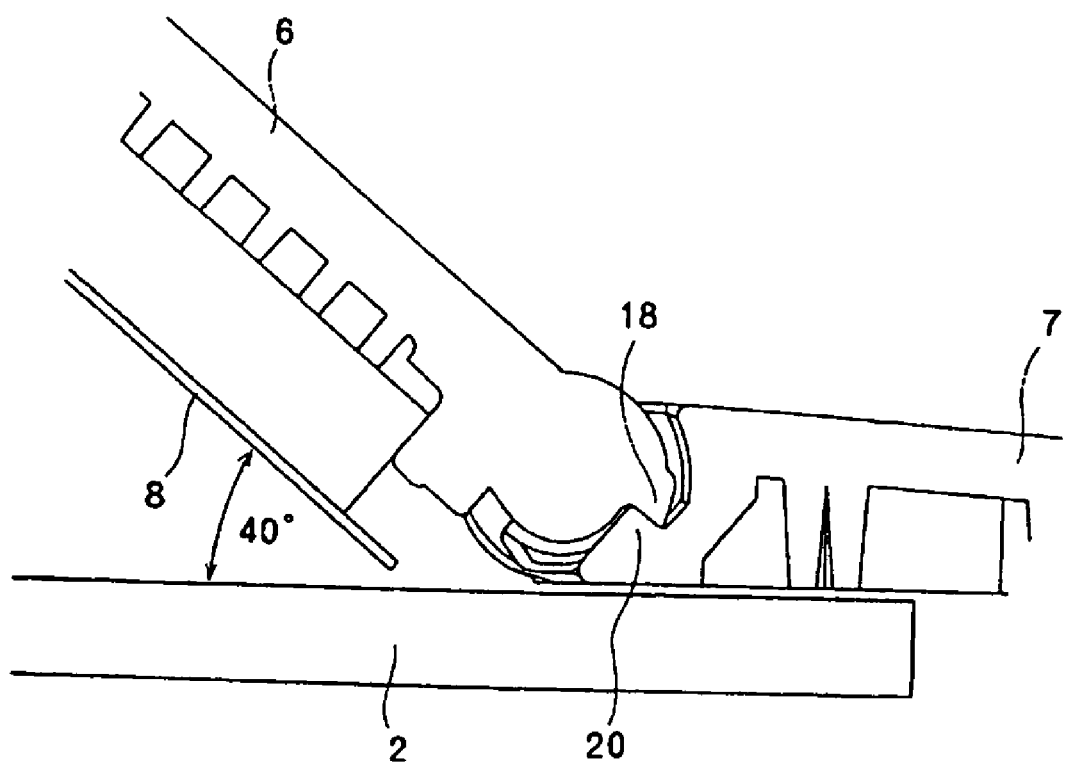

F I G. 2 7
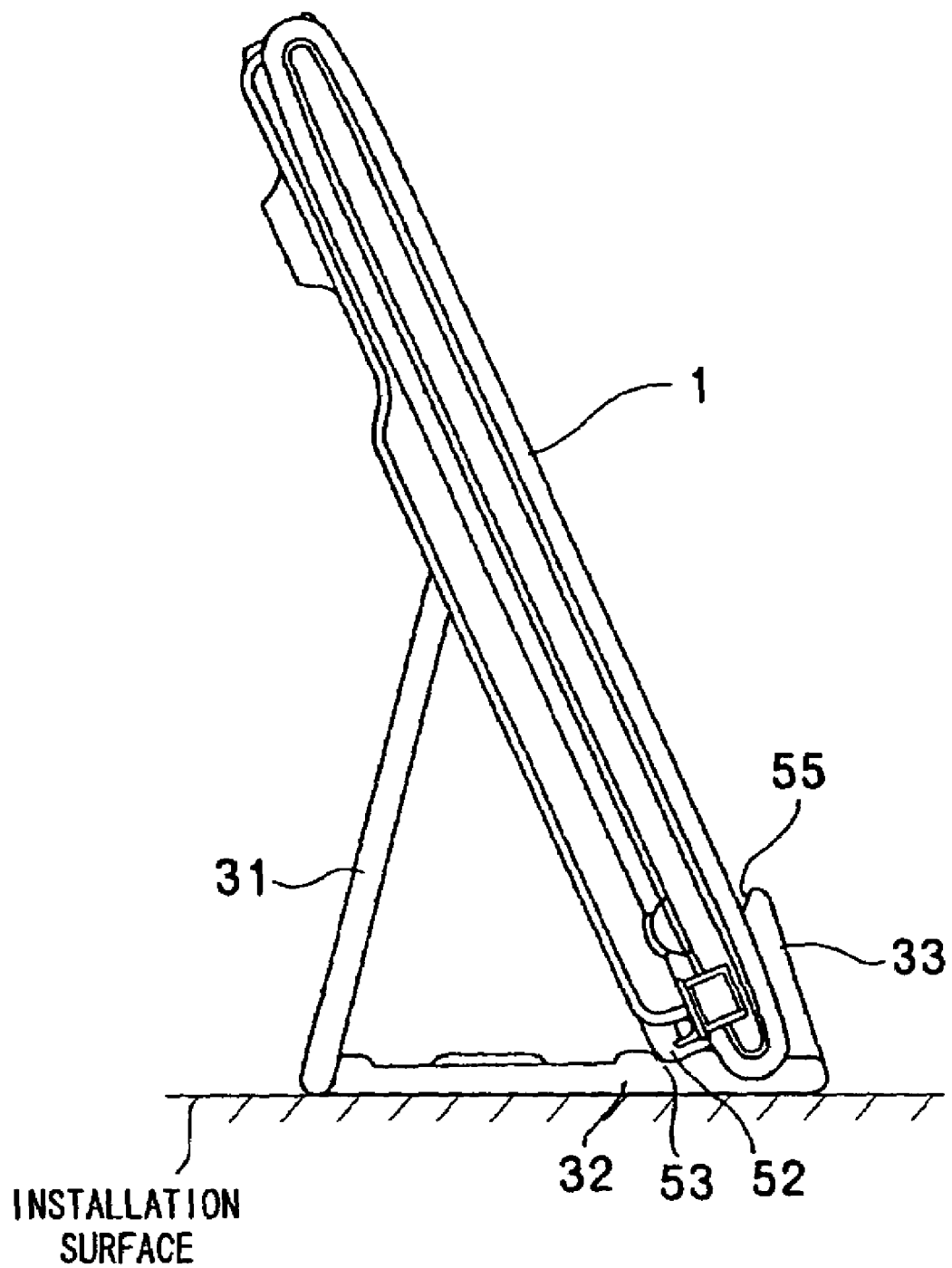

IMAGE READING APPARATUS HAVING SUPPORT STRUCTURE

BACKGROUND OF THE INVENTION

1. Field of the Invention

This invention relates to an image reading apparatus which reads out image information of a document which was placed on a document table.

2. Related Background Art

Conventionally, in this kind of image reading apparatus, as disclosed in Japanese patent laid-open publication, JP-A-2000-156756 publication (corresponding US registration 6311940), an image reading apparatus main body propped up against a support structure so as to be held in a vertically placed condition has been known. By placing an image reading apparatus in a vertically placed condition in this manner, it is possible to use it suitably even in the case that it becomes difficult to secure an installation area.

However, in the image reading apparatus which was disclosed in JP-A-2000-156756 publication, a support structure for holding it in a vertically placed condition is separated from the image reading apparatus main body, and therefore, there is a problem in a storage performance of the support structure, and it is concerned that convenience is deteriorated. The invention was made in view of the above-described circumstances, and aims to provide a technology which can improve convenience, by realizing improvement of such a storage performance of a support structure in which an image reading apparatus can be held in a vertically placed condition.

SUMMARY OF THE INVENTION

To achieve the above-described object, an image reading apparatus according to the present invention is constituted as follows.

An image reading apparatus which reads out image of a document, that is placed on a document table, and covered by a cover member has a support structure which supports a main body of the image reading apparatus in such a vertically placed condition that the document table is placed nearly vertically to an installation surface, and a storage section which stores the support structure on a bottom portion on the side of the installation surface of the image reading apparatus main body in such a horizontally placed condition that the document table is placed nearly horizontally to the installation surface, wherein the support structure has a supporting portion which is pivotally mounted on the bottom portion and supports the bottom portion of the image reading apparatus main body, on the occasion of holding the image reading apparatus main body in the vertically placed condition, and a holding portion which holds an end portion on the side of the installation surface of the image reading apparatus main body.

BRIEF DESCRIPTION OF THE DRAWINGS

The invention, together with further advantages thereof, may best be understood by reference to the following description taken in conjunction with the accompanying drawings in which:

FIGS. 15 through 23 are views for explaining the condition that the document cover is opened in the image reading apparatus which relates to the embodiment of the invention;

FIGS. 25 through 28 are views for explaining a method of installing the support structure, which relates to the embodiment of the invention, in a vertically placed condition;

DETAILED DESCRIPTION OF THE EMBODIMENT

Hereinafter, with reference to the drawings, a best mode for carrying out this invention will be described in detail in an exemplification manner. In this regard, however, dimensions, materials, shapes of constituent components which are described in this embodiment, a relative configuration of them and so on should be changed arbitrarily depending on a configuration and various conditions of an apparatus to which the invention is applied, and they do not mean to limit a scope of the invention to the following embodiments.

(Overall Configuration)

Figure 1:
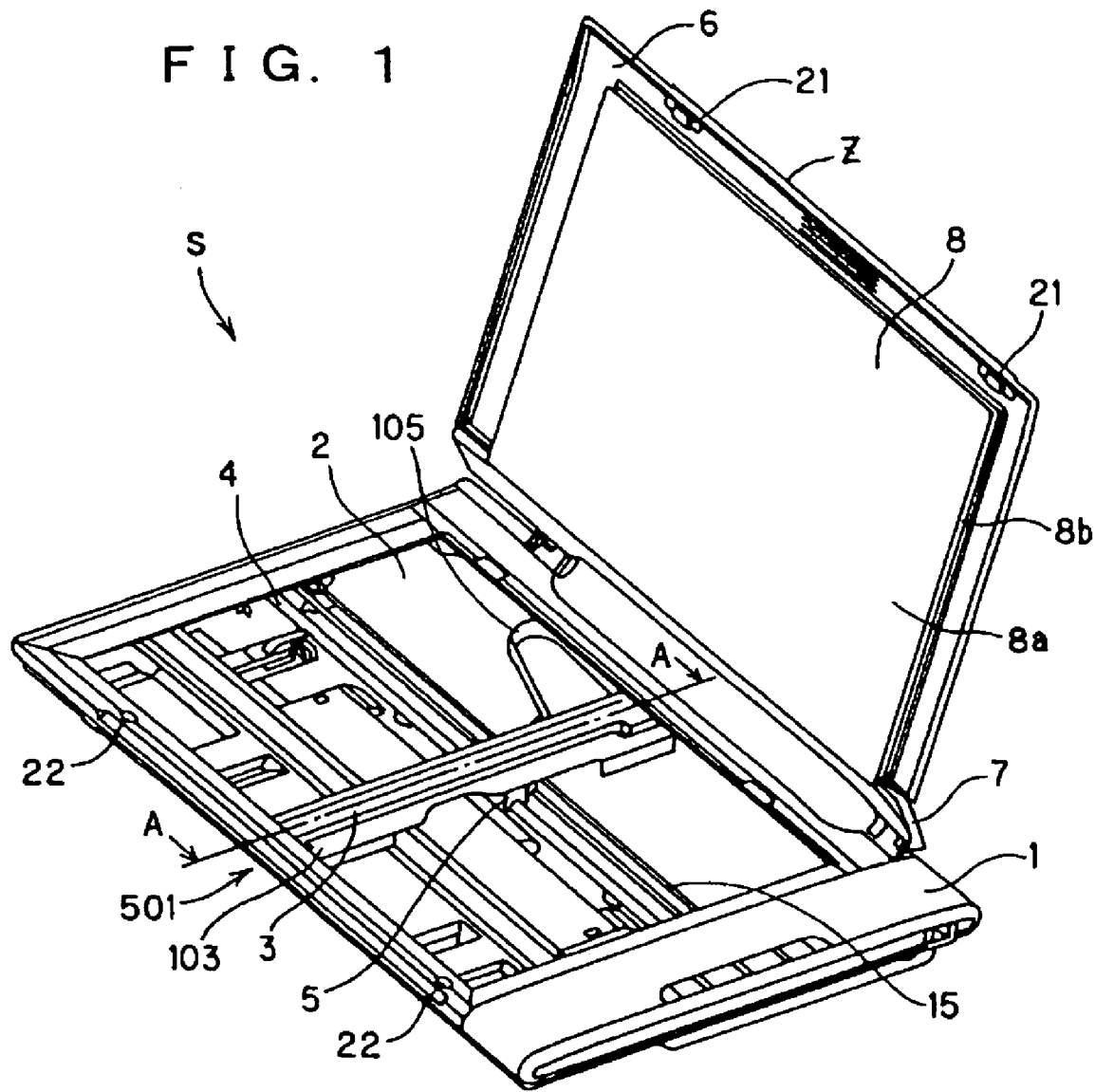
FIG. 1 is a pattern view for explaining a configuration of an image reading apparatus which relates to an embodiment of the invention.

FIG. 1 is a pattern view for explaining a configuration of an image reading apparatus which relates to an embodiment of the invention.

As shown in FIG. 1, an image reading apparatus S reads out an image of a document which is set (placed) on a document table glass (document table) attached to its upper surface, by having a contact image sensor 3 (hereinafter, referred to as CIS) as image reading means scan the image in parallel to the document table glass 2.

Figure 2:
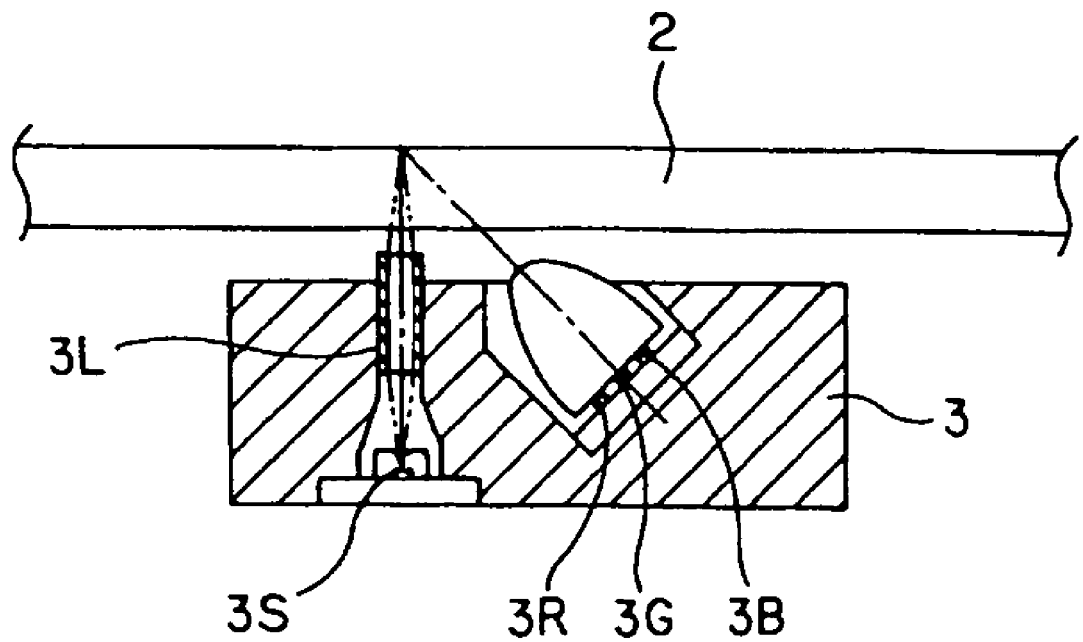
FIG. 2 is a schematic cross-sectional view of a contact image sensor in the embodiment of the invention.
Figure 3:
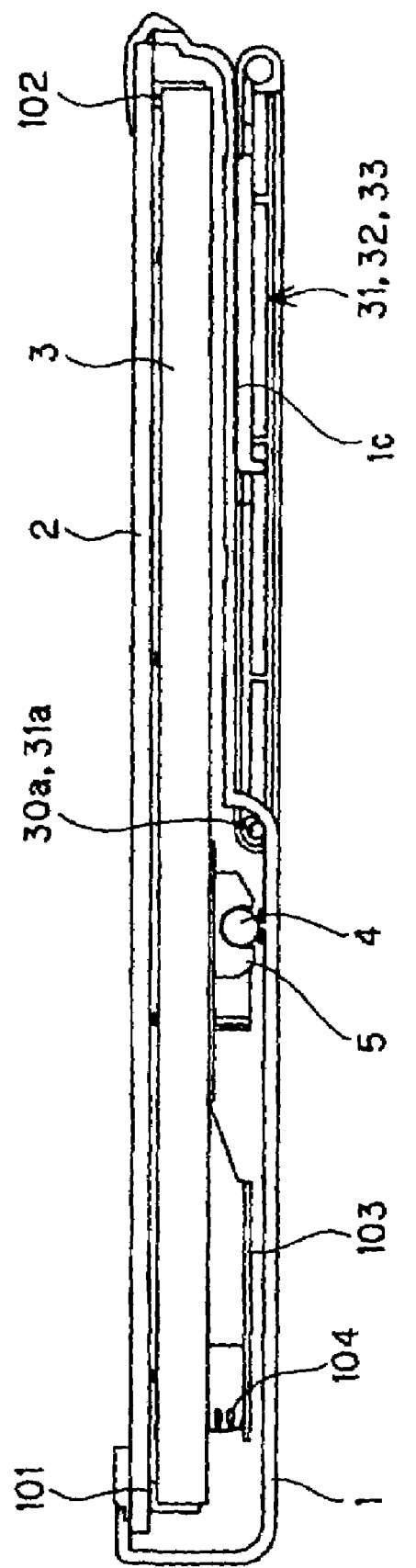
FIG. 3 is a view which shows an A-A cross-section of FIG. 1.
Figure 4:
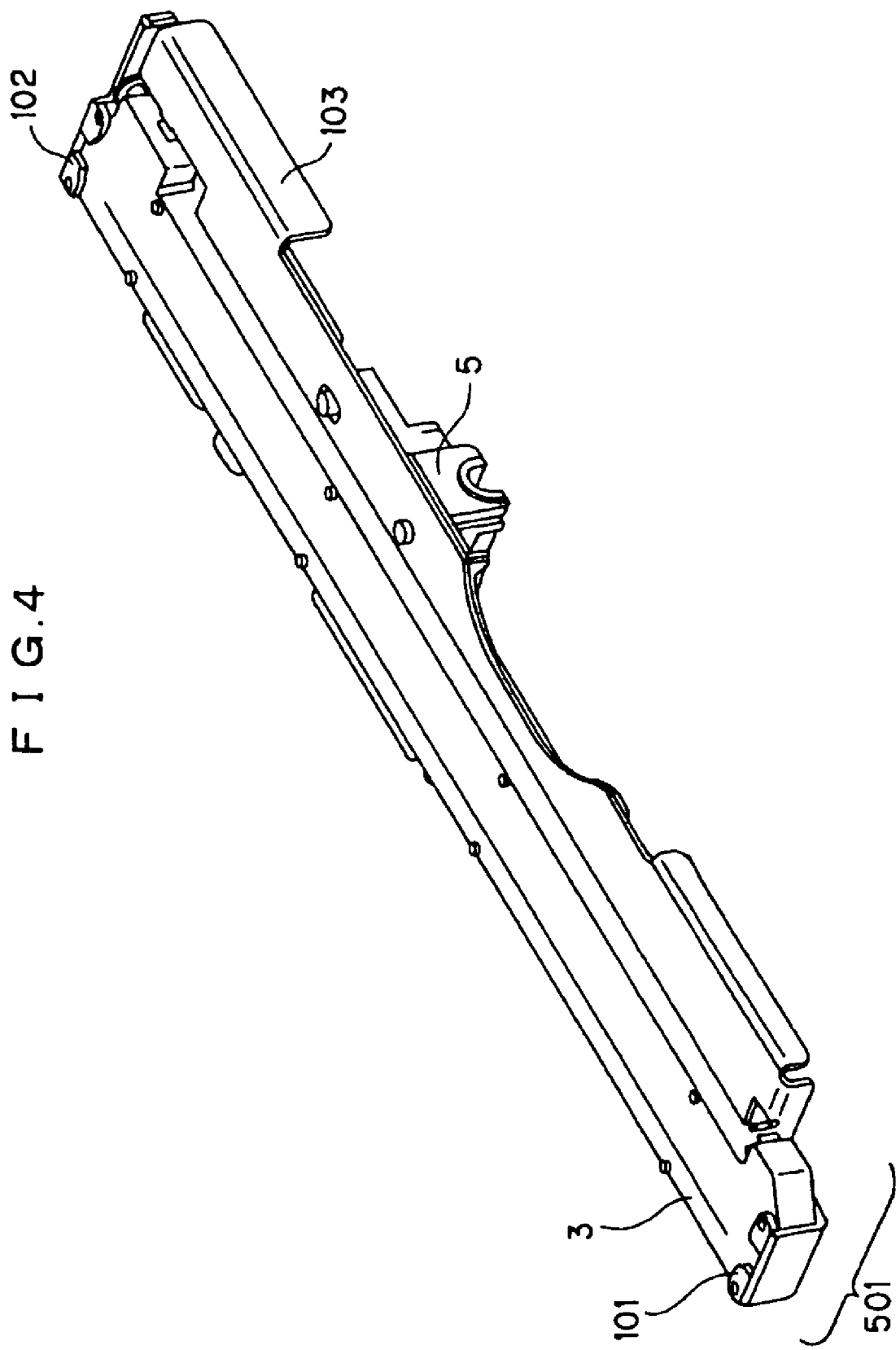
FIG. 4 is a schematic perspective view of a carriage unit in the embodiment of the invention.

FIG. 2 is a schematic cross-sectional view of CIS 3 in this embodiment. FIG. 3 is a view which shows an A-A cross-section in FIG. 1. FIG. 4 is a schematic perspective view of a carriage unit on which the contact image sensor 3 is disposed.

As to CIS 3, as shown in FIG. 2, into its inside, three color LEDs 3R, 3G, 3B which are light sources for document irradiation, a rod lens array 3L for providing an image of reflected light from a document on a light-sensitive element of CIS 3 and an image sensor 3S are incorporated.

The three color light sources are changed over sequentially to be lighted up, and the image sensor 3S reads out reflected light from a document with respect to each color, and thereby, color separation reading is carried out.

The above-described CIS 3 is supported by a sensor holder 103, and as shown in FIG. 3, it is contacted with pressure to the document table glass 2, through spacers 101, 102 which are made of a material with a good sliding performance, by a spring 104 which is positioned on the sensor holder 103.

The sensor holder 103 is fixed and supported on a slider 5 which slides on a guide shaft 4 fixed to an apparatus main body 1, as shown in FIG. 1.

Here, a unit integrated with the slider 5, such as CIS 3, the sensor holder 103, the spring 104, and the slider 5 shown in FIG. 4, is hereinafter called as a carriage 501.

In addition, to the slider 5, a belt 15 for conveying a motive force from a motor which is a scanning drive source is fixed. By forward and backward rotations of the motor, the carriage 501 is configured so as to be able to carry out reciprocating scanning within a range of the document table glass 2.

In addition, one side of a flexible cable 105 for electric input and output of the sensor 3 is connected to the sensor 3, and the other side of the same is connected to a control board (not shown in the figure) of the image reading apparatus main body.

As shown in FIG. 3, as to the apparatus main body 1, a right side of the position that the slider 5 scans in the figure is configured so as to be thin up to a position separated from the sensor by a clearance portion, and at that position, a support structure (31 through 33) is pivotally mounted at 30a.

That is, as to a thickness direction of internal components of the apparatus main body on the side that the support structure is disposed, a total of the sensor and a component which is attached firmly to it is a maximum thickness, and among other necessary components, only those, which are accommodated within its height, are disposed in parallel. A thickness of the apparatus main body 1 at this portion is only (document table glass+close coupling type sensor+component attached firmly to the sensor+clearance gap+frame body).

Detail of the support structure will be described later.

In addition, to the slider 5, the belt 15 for conveying a motive force from the motor which is a scanning drive source is fixed. By forward and backward rotations of the motor, CIS 3 is configured so as to be able to carry out reciprocating scanning within a range of the document table glass 2.

Among constituent elements of the image reading apparatus, there is an electric section which is composed of a control board and a power source, in addition to the above-described elements. These constituent elements are disposed in the apparatus main body 1 which fixes and supports the document table glass.

In addition, on the document table glass 2, a document cover 6 as a pressing member for pressing a document to the document table glass 2 is attached, in openable and closable manners, to the apparatus main body 1 through a hinge 7 as a hinge member.

In addition, to an inner surface of the document cover 6 as a surface facing to the document table glass 2, a document pressing-contacting sheet 8 as a pressing-contacting member which is composed of a sheet member 8a and an elastic member 8b is pasted. Here, the document cover 6 and the hinge 7 configure a cover member.

Figure 5:
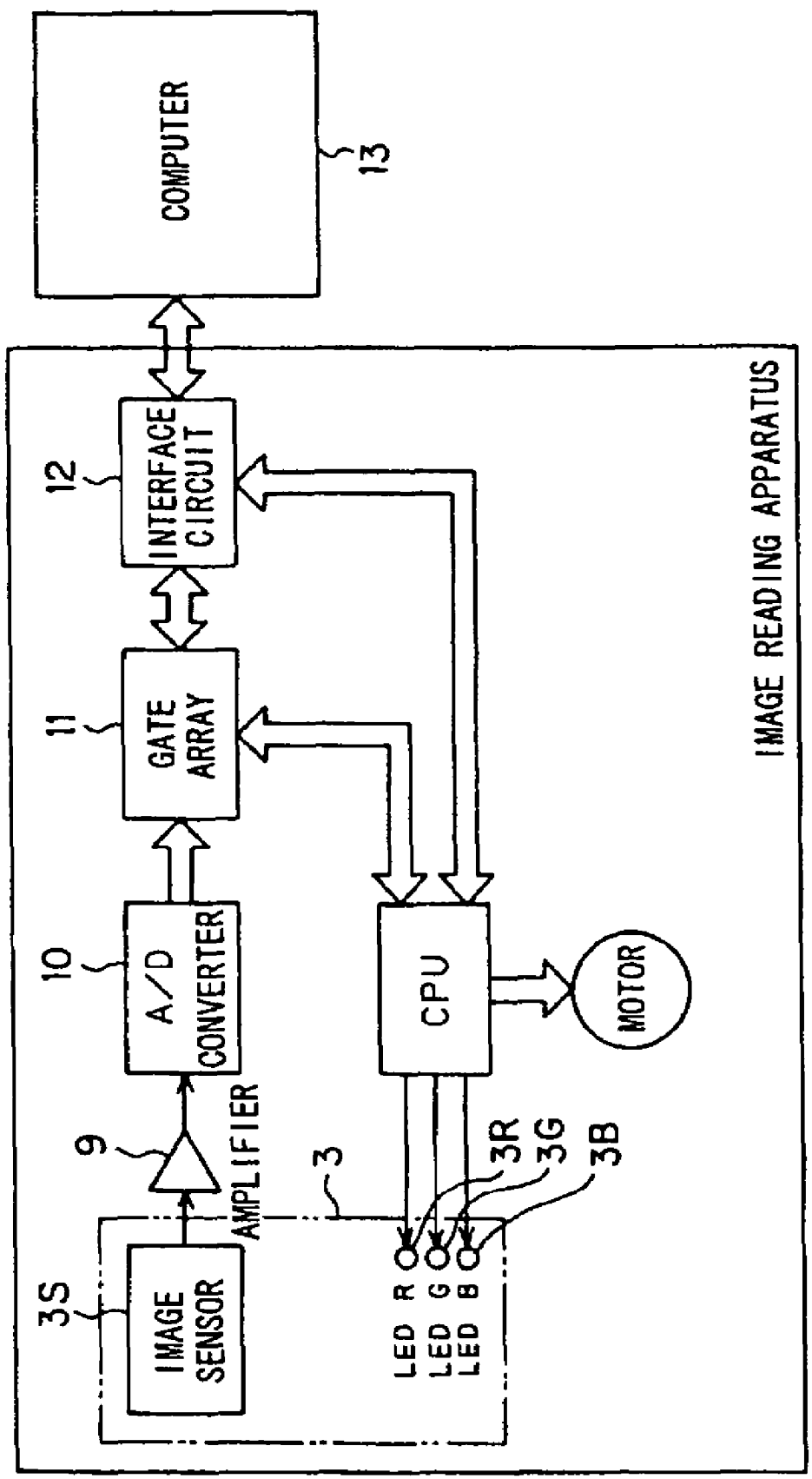
FIG. 5 is a read image data processing block according to the image reading apparatus which relates to the embodiment of the invention.

FIG. 5 is a read image data processing block diagram according to the image reading apparatus.

An image output signal, which was read out by the image sensor 3 in synchronization with LEDs which turn on and off sequentially, is sent to an amplifier 9 and amplified there, and after that, converted into a digital image signal by an A/D converter 10. The A/D converter 10 divides a dynamic range (a read output difference between a stark white portion and an intense black portion on a document) of the image sensor 3S into portions of its bit number, and allocates a tone number depending on brightness of an image on a document. For example, in case that an A/D converter with 8 bit resolution is used, it is possible to discriminate the brightness of an image ranging from white to black by 256 tone levels, and in case of a 10 bit A/D converter, it is possible to discriminate it by 1024 tone levels. Therefore, in case of color reading due to RGB three color light sources in the image reading apparatus using an 8 bit A/D converter, it is possible to discriminate 24 bit=approximately 16.70 million colors, and in case of 10 bit, it is possible to discriminate 30 bit=approximately 1074 million colors.

There are several kinds of output forms of image signals of an image reading apparatus, and depending on a usage of an image which was read out, it is possible to select an output form which is suitable for it. In case that a text is read out and its content is applied to OCR (optical character reader), and in case of reading out monochrome line drawings, a monochrome binary image is suitable. In this case, used is image data which was converted from an image signal which was obtained by lighting, for example, only G, among the above-described RGB light sources, into binary codes at a certain threshold value by an image processing circuit incorporated into a gate array 11.

In case of reading out an image for the purpose of reading out an image such as a photograph and outputting it to a monochrome printer, used is image data which was converted into binary codes by using halftone processing such as a dither method and an error diffusion method, through the use of an image signal due to the G light source likewise.

In case of carrying out processing of a color image, a multi-valued (24 bit etc.) image data is suitable.

The above-described image signal, which passed through the image processing circuit, is outputted to a device such as a personal computer 13 through an interface circuit 12.

(Document Cover/Hinge Configuration)

Next, an opening/closing configuration of the document cover 6 to the apparatus main body 1 will be described.

Figure 6:
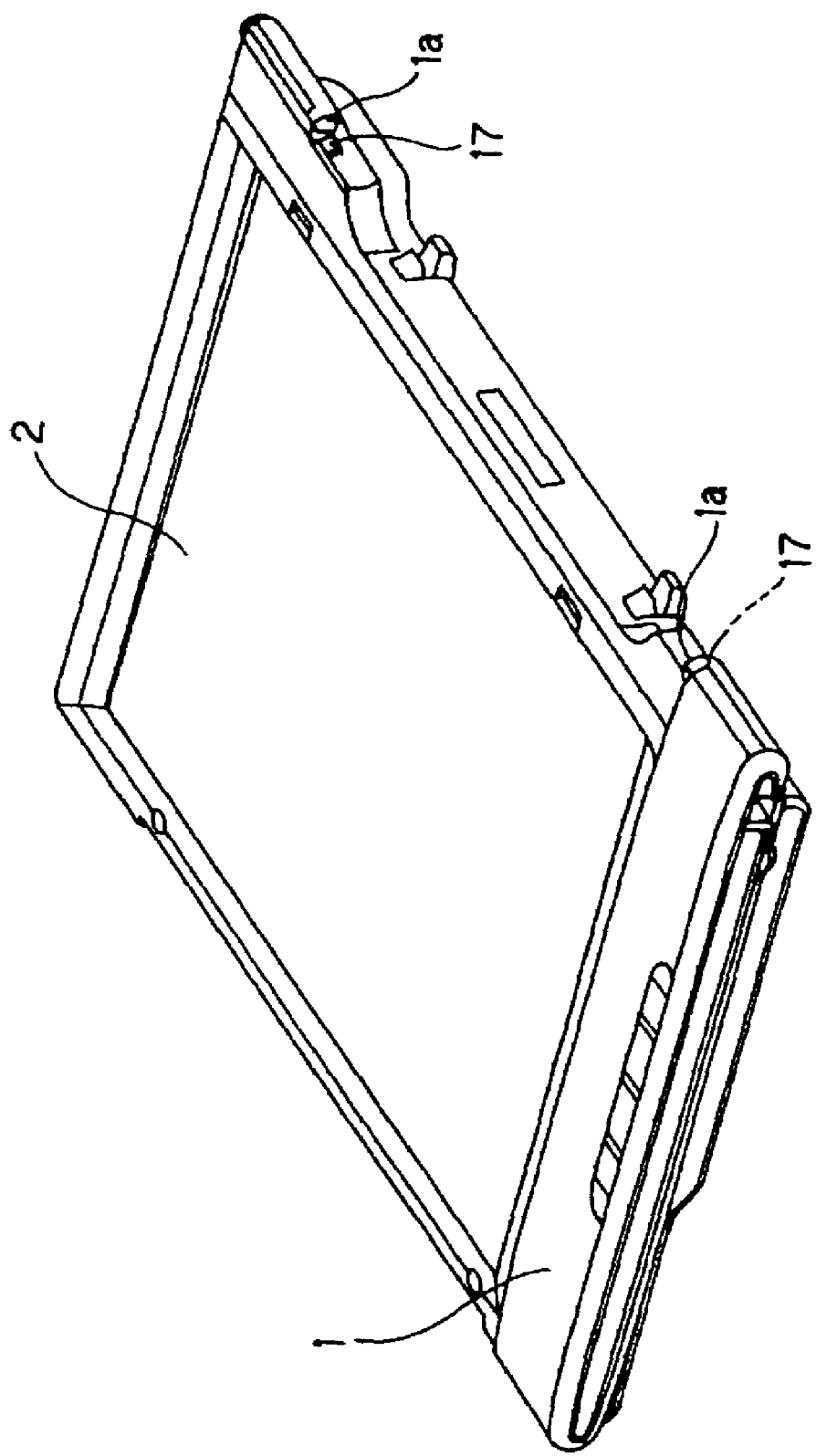
FIGS. 6 through 8 are views for explaining a configuration of a hinge which couples a document cover in openable and closable manners, in the image reading apparatus which relates to the embodiment of the invention.
Figure 7:
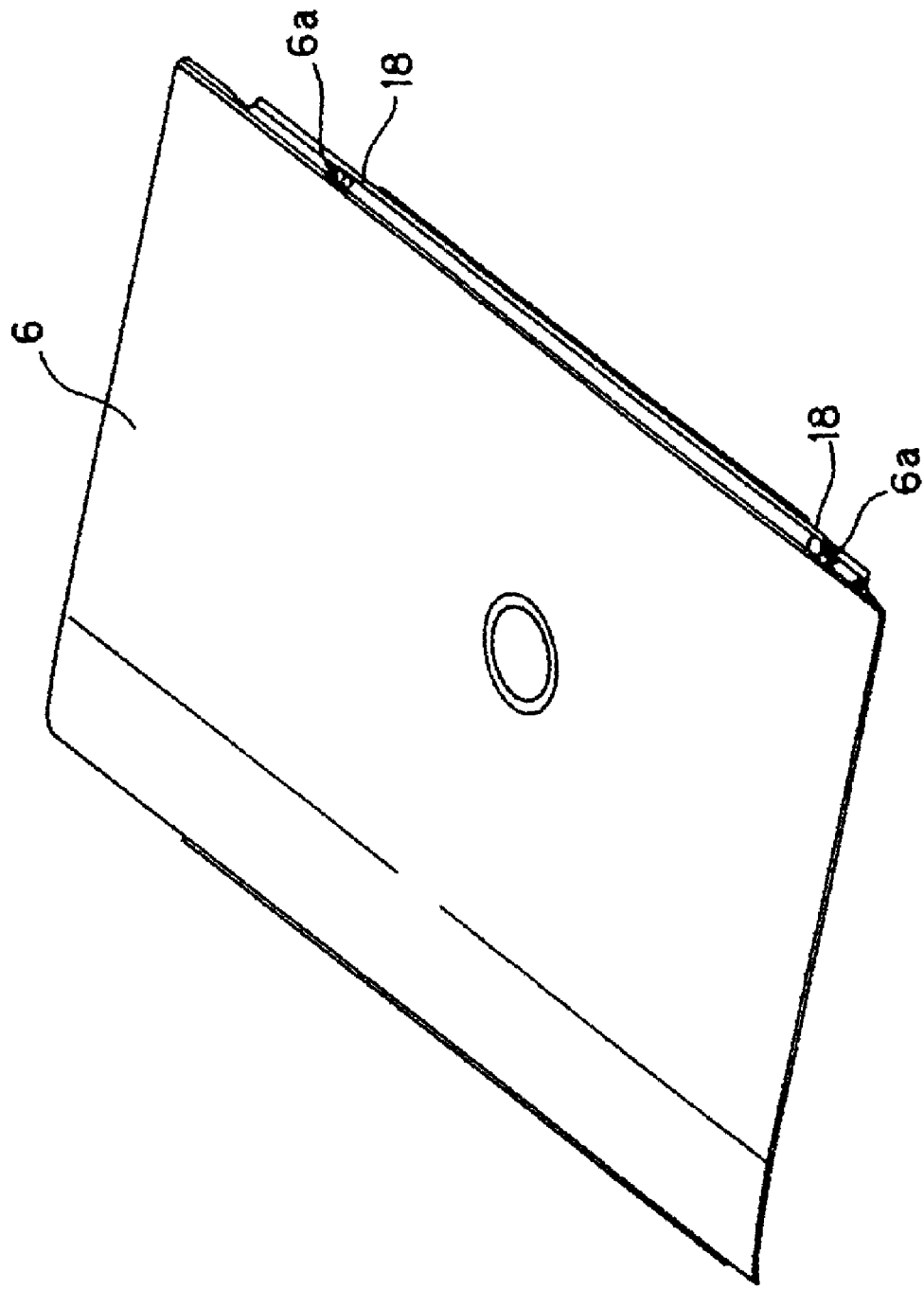
Figure 8:
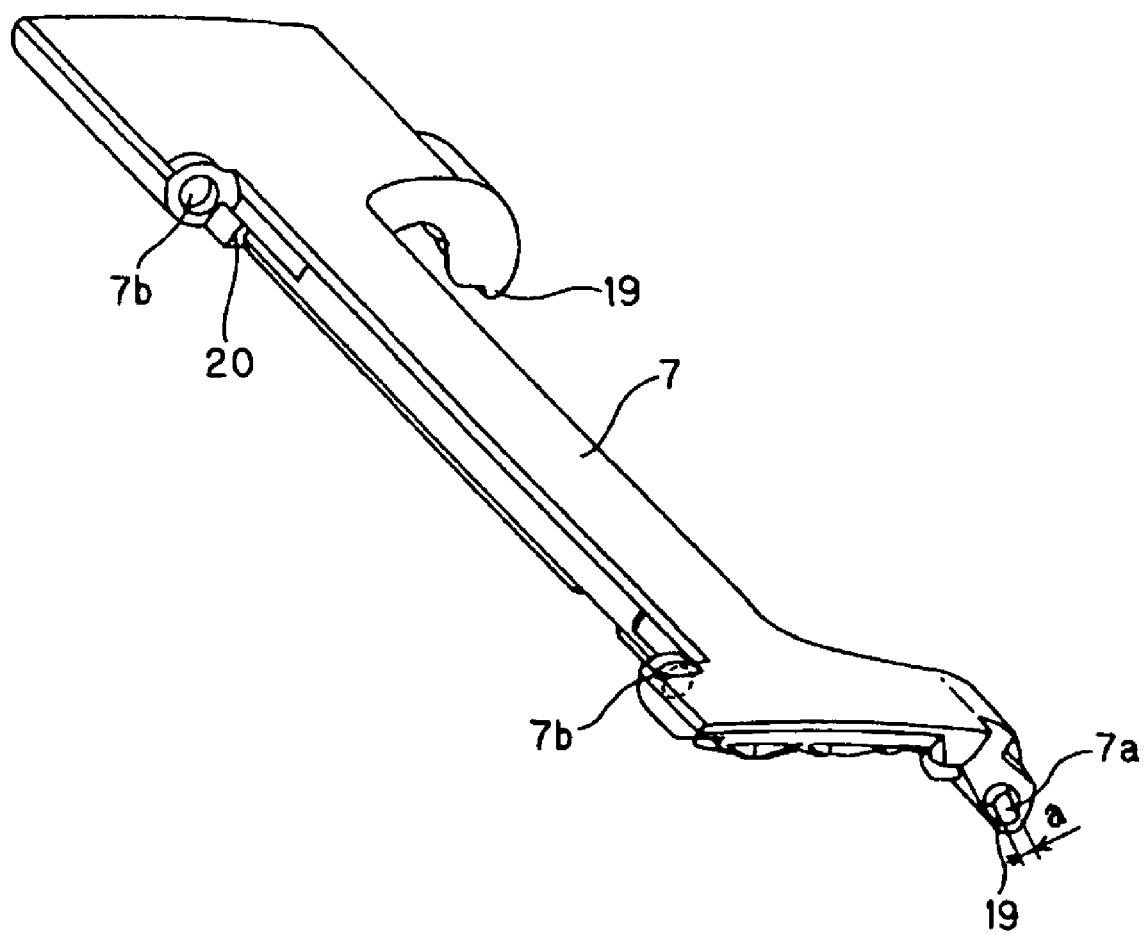

FIGS. 6 through 8 are views for explaining a configuration of a hinge which couples the apparatus main body 1 and the document cover 6 in an openable and closable manner.

That is, FIG. 6 is a view which shows the apparatus main body 1 (the condition that the document cover 6 was removed from the image reading apparatus) in this embodiment, and FIG. 7 is a view which shows the document cover 6, and FIG. 8 is a view which shows the hinge 7.

Figure 9:
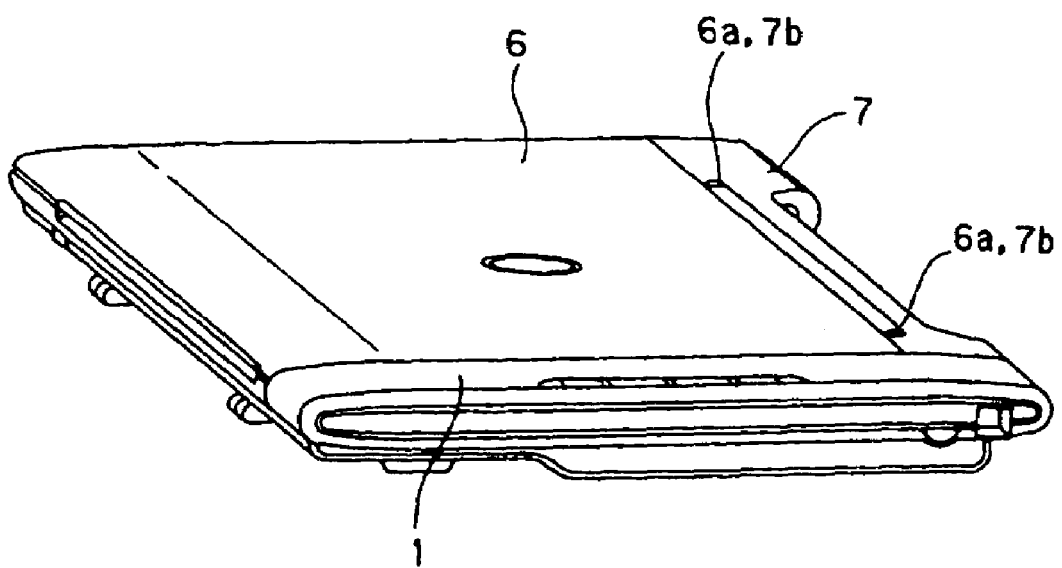
FIG. 9 is a view for explaining the condition that the document cover is closed in the image reading apparatus which relates to the embodiment of the invention.
Figure 10:
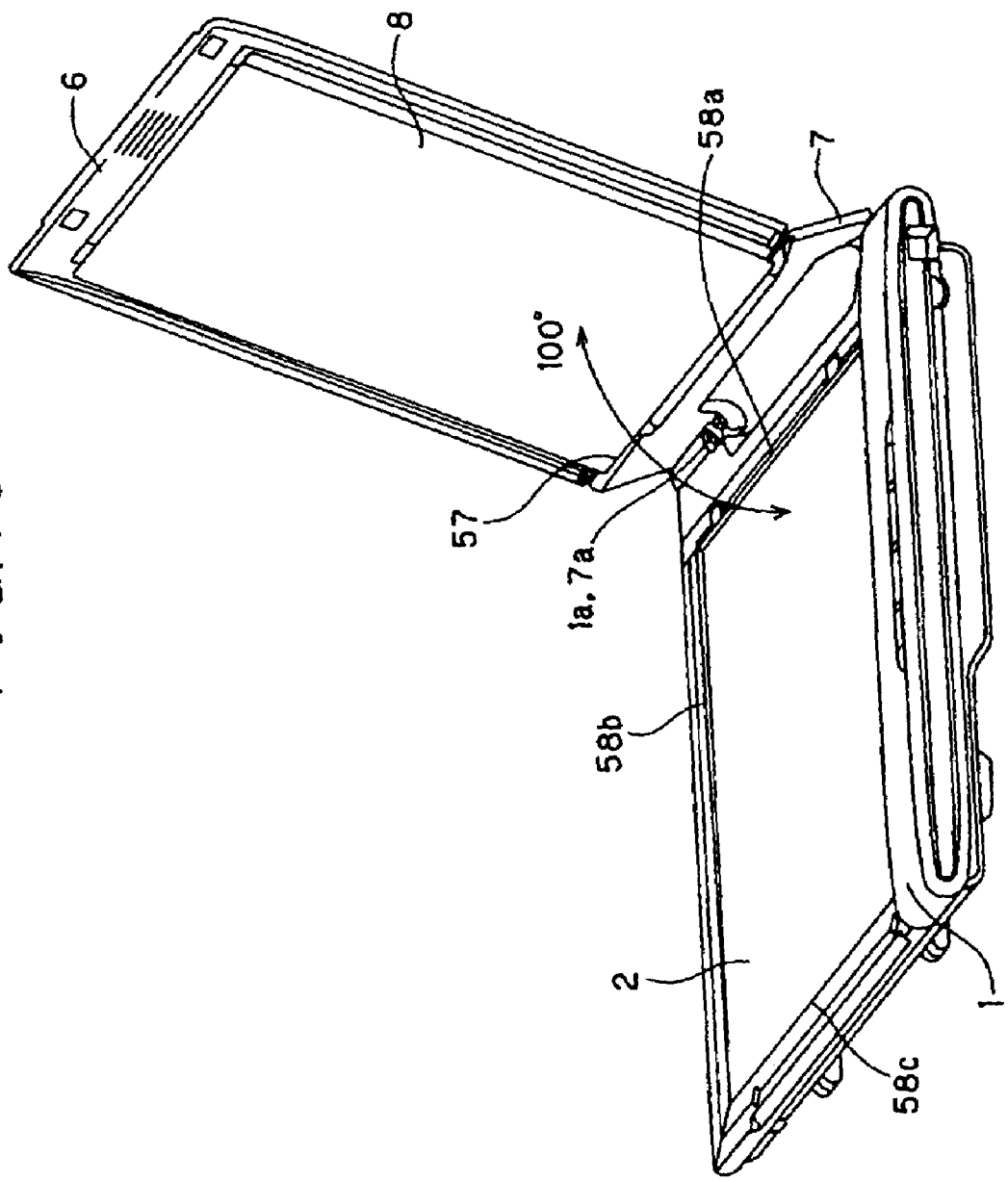
FIG. 10 is a view for explaining the condition that the document cover is opened by 100 degrees in the image reading apparatus which relates to the embodiment of the invention.

In addition, FIG. 9 is a view for explaining the condition that the document cover 6 was closed, and FIG. 10 is a view for explaining the condition that the document cover 6 was opened by nearly 100°.

Figure 11:
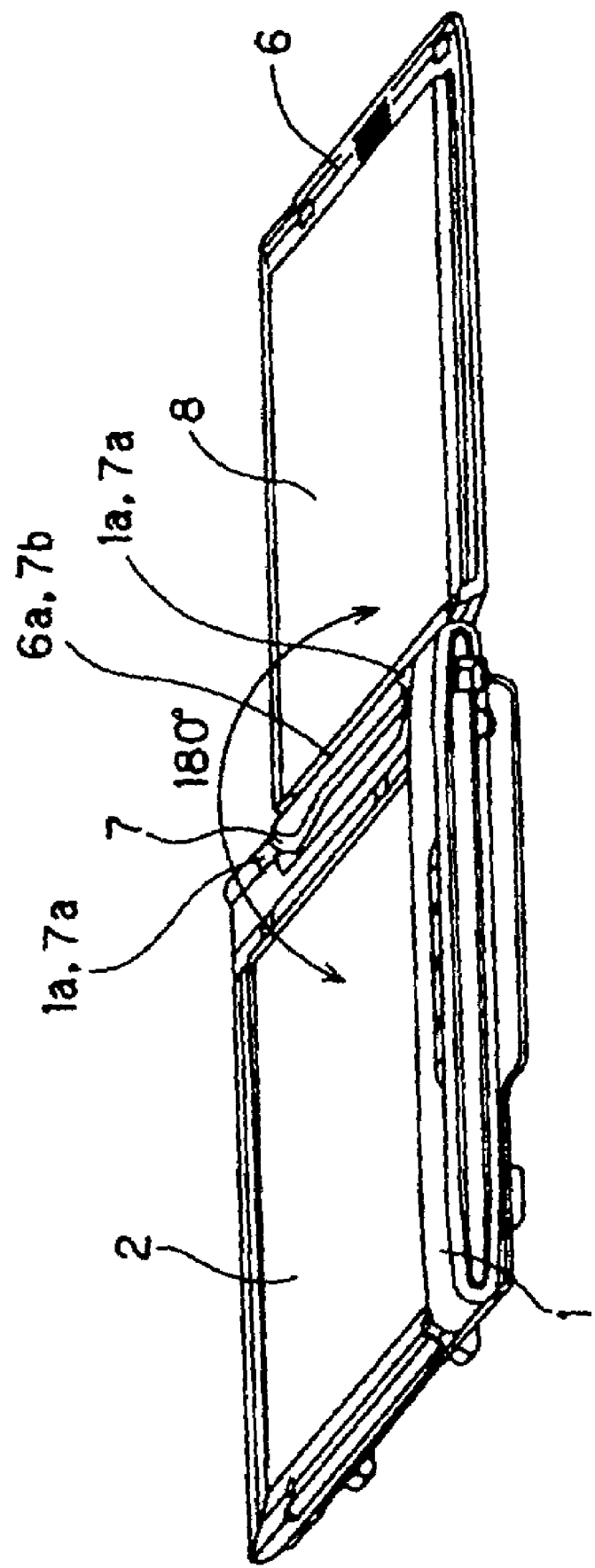
FIG. 11 is a view for explaining the condition that the document cover is opened by 180 degrees in the image reading apparatus which relates to the embodiment of the invention.
Figure 12:
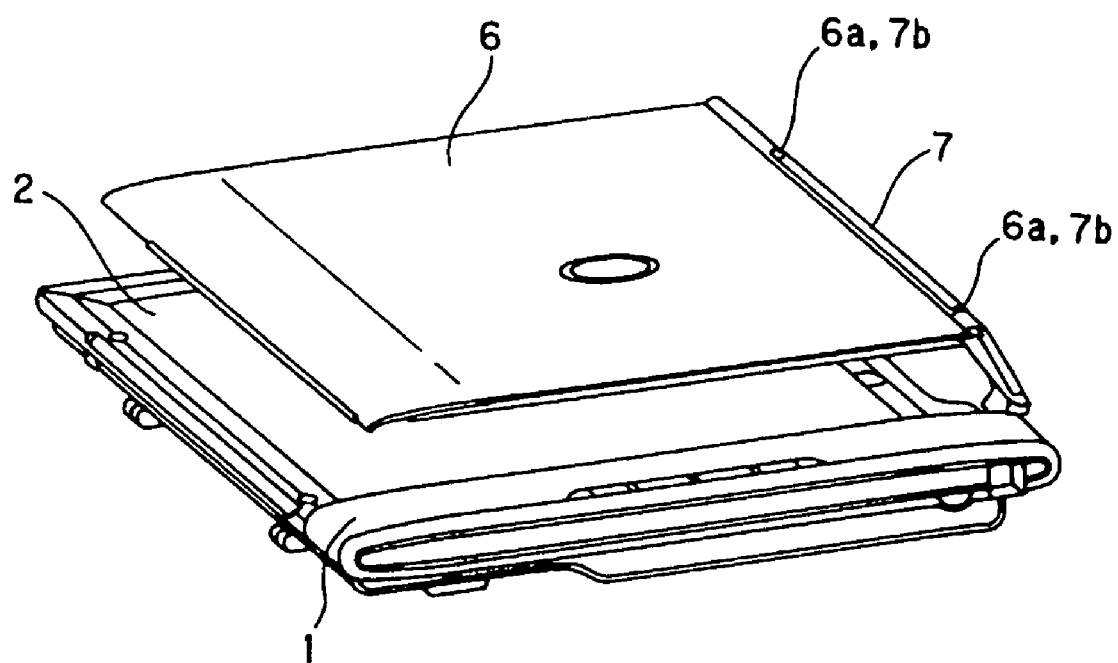
FIGS. 12 and 13 are views for explaining the condition that only the hinge was opened by 60 degrees in the image reading apparatus which relates to the embodiment of the invention.
Figure 13:
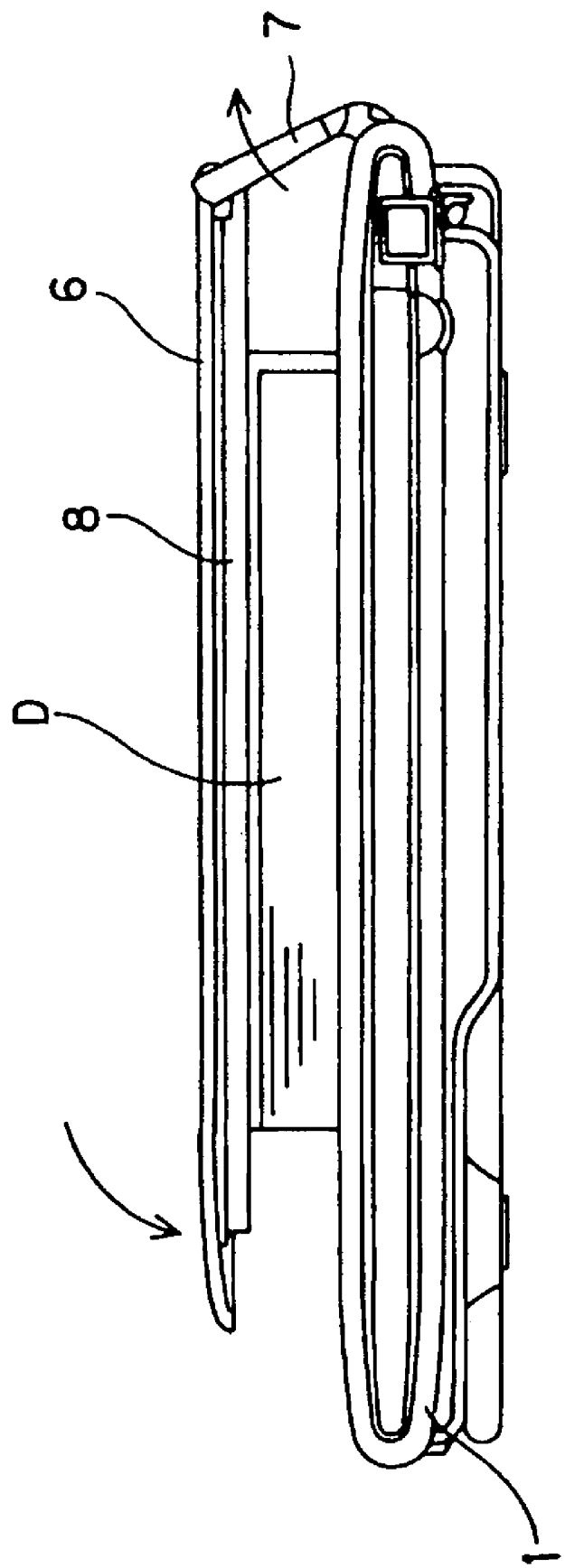

FIG. 11 is a view for explaining the condition that the document cover 6 is opened by nearly 180°, and FIGS. 12 and 13 are view of the condition that only the hinge 7 is opened by nearly 60° (the condition that the document cover 6 was moved nearly in parallel to the document table glass 2).

As shown in FIGS. 6 through 13, on the image reading apparatus, the document cover 6 for pressing a document P to the document table glass 2 and the hinge 7 for connecting the apparatus main body 1 and the document cover 6 are disposed, and thereby, the document cover 6 becomes openable and closable to the apparatus main body 1.

Here, between the apparatus main body 1 and the hinge 7, a fitting portion of a concave portion 1a which is disposed at a rear end portion of the apparatus main body 1 and a convex portion 7a which is disposed at a rear end portion of the hinge 7 becomes a supporting point (pivot, pivoting axis), and the hinge 7 becomes openable and closable to the apparatus main body 1.

Meanwhile, the concave portion 1a configures a bearing portion of a open position adjustment mechanism which relates to the invention, and the convex portion 7a configures a pivoting axis of the open position adjustment mechanism which relates to the invention.

In addition, between the hinge 7 and the document cover 6, a fitting portion of a concave portion (hereinafter, referred to as axis supporting portion) 7b which is disposed at a front end portion of the hinge 7 and a convex portion (hereinafter, referred to as axis supporting portion) 6a which is disposed at a rear end portion of the document cover 6 becomes a supporting point (pivot, pivoting axis), and they become pivotable relatively.

In this manner, between the apparatus main body 1, the hinge 7 and the document cover 6, two (two points) fitting portions are used as supporting points, and they are connected pivotally, and by this means, the document cover 6 becomes openable and closable to the apparatus main body 1.

Meanwhile, in this embodiment, a side, which configures a pivot with the hinge 7 in the apparatus main body 1, is assumed to be a rear side, and a side, which is in a nearly orthogonal direction to the pivoting axis in the apparatus main body 1 and is separated from the pivoting axis, is assumed to be a front side (an arrow F side shown in FIG. 9).

In the hinge 7 and the document cover 6, front and rear are defined under such a condition that they are closed to the apparatus main body 1.

Figure 14:
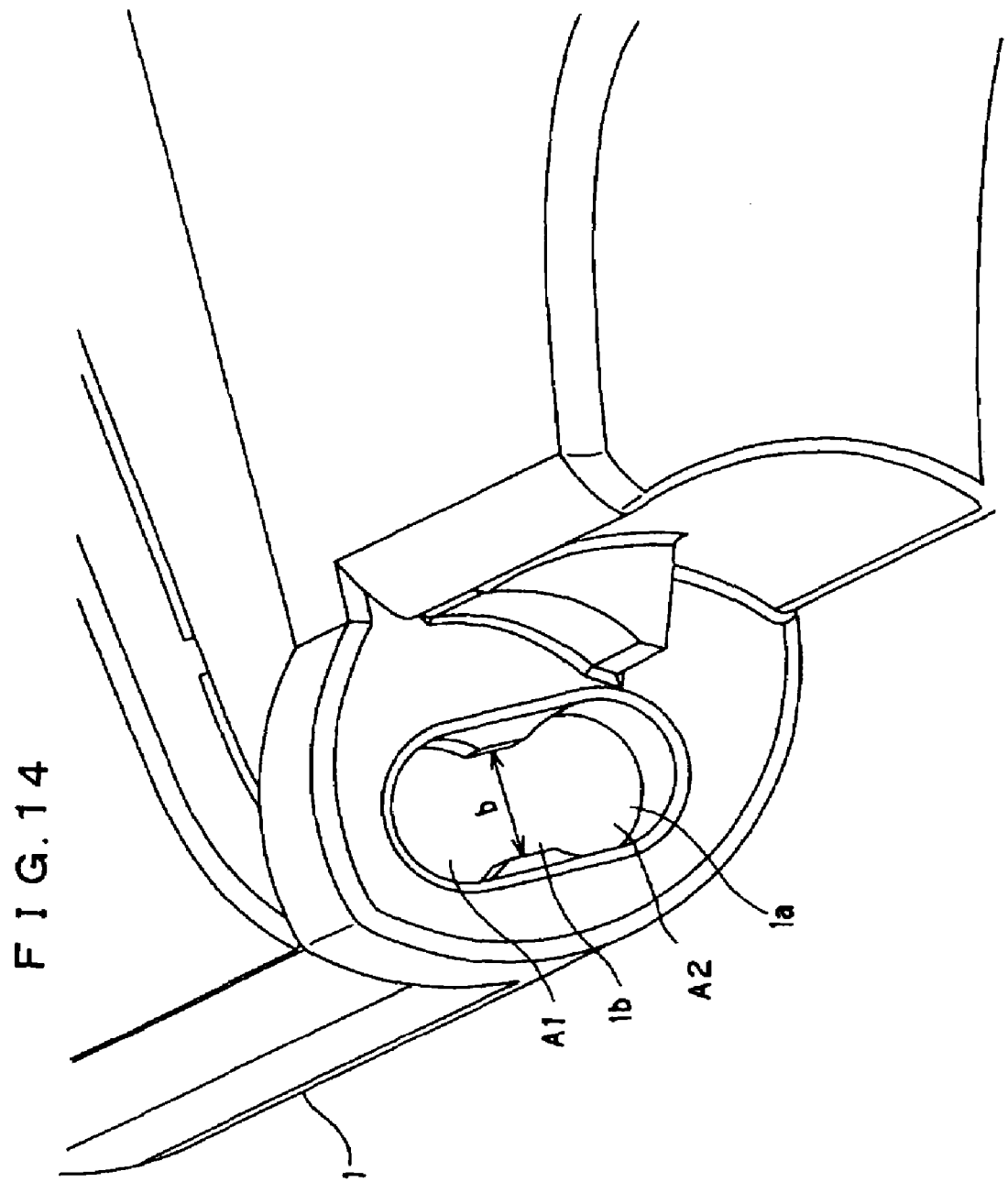
FIG. 14 is a view which shows a fitting portion with the hinge in an apparatus main body of the image reading apparatus which relates to the embodiment of the invention.

FIG. 14 is a view which shows a fitting portion with the hinge 7 in the apparatus main body 1.

Here, the concave portion 1a of the apparatus main body 1 is formed as a nearly gourd shape as shown in FIG. 14 in detail, and it has two pivots (pivot, pivoting portions) A1, A2 in up and down directions (nearly orthogonal direction to the document table glass 2) under a horizontally placed condition (the document table glass 2 is nearly horizontal).

In addition, as to the convex portion 7a at a rear end portion of the hinge 7, as shown in FIG. 8, its both end portions in a radial direction (in case of using the convex portion 7a as a pivoting axis, an orthogonal direction to the pivoting axis) at its front end portion of the convex portion are cut out in the form of a nearly plane, and a distance a of plane portions which are configured by these two planes is set up to be slightly smaller than a width b of the above-described nearly gourd shaped constricted portion 1b (a<b).

Here, in the convex portion 7a, the plane portion having cut both ends and the distance a configures a moving portion which relates to the invention, and a non-cut peripheral portion configures a pivoting portion relating to the invention, which pivots in the pivoting portions A1 and A2. In addition, the nearly gourd shaped constricted portion 1b communicates the two pivoting portions A1, A2, and configures a communicating path of a changeover mechanism which relates to the invention By this means, only when the hinge 7 was opened by a certain specific angle to the apparatus main body 1, the plane portion of the convex portion 7a passes through the above-described gourd shaped constricted portion 1b, and it can move between the pivoting portions A1 and A2, arbitrarily within a condition of an opening angle of the hinge 7.

When the opening angle of the hinge 7 to the apparatus main body 1 is an angle other than the above-described specific angle, the convex portion 7a is held pivotally at any one position of the pivoting portions A1, A2.

Hereinafter, three ways of opening the document cover 6 will be described.

Figure 22:
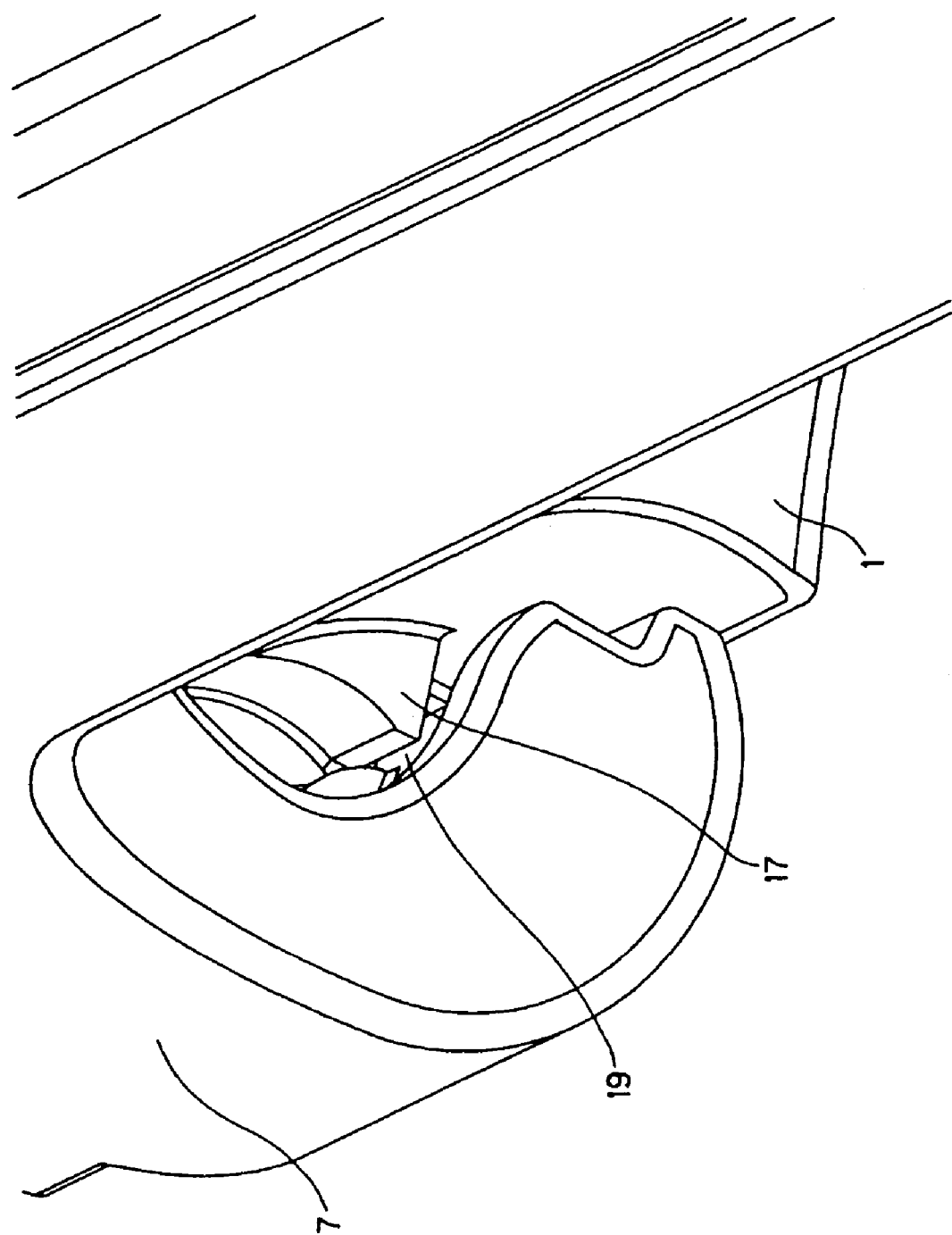
Figure 23:
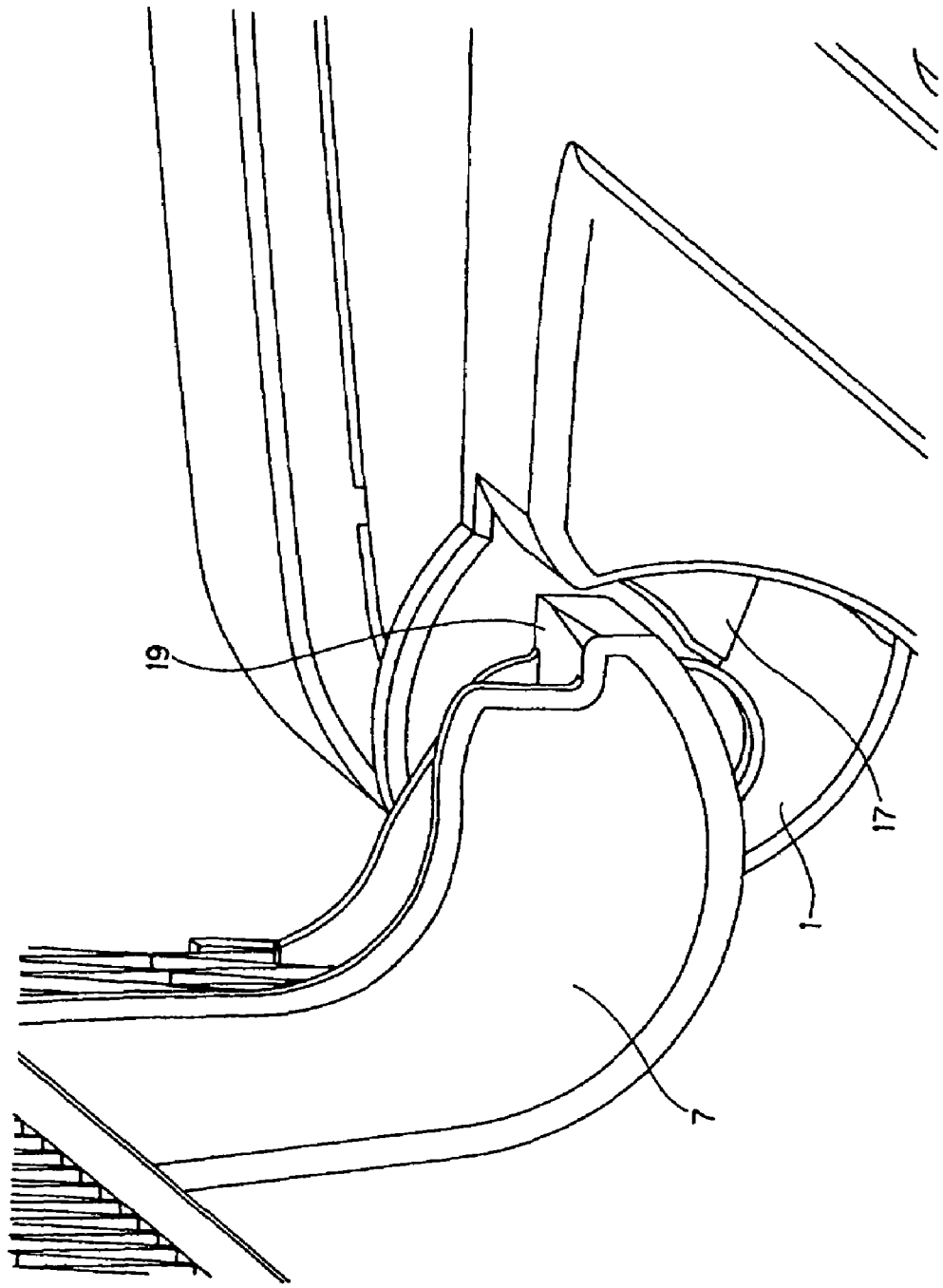

FIGS. 15 through 23 are views for explaining the condition that the document cover is opened in the image reading apparatus which relates to the embodiment of the invention, and especially in FIGS. 21 through 23, they are ones for explaining a restricted condition of a pivoting portion (fitting portion).

(Document Cover Open)

Figure 15:
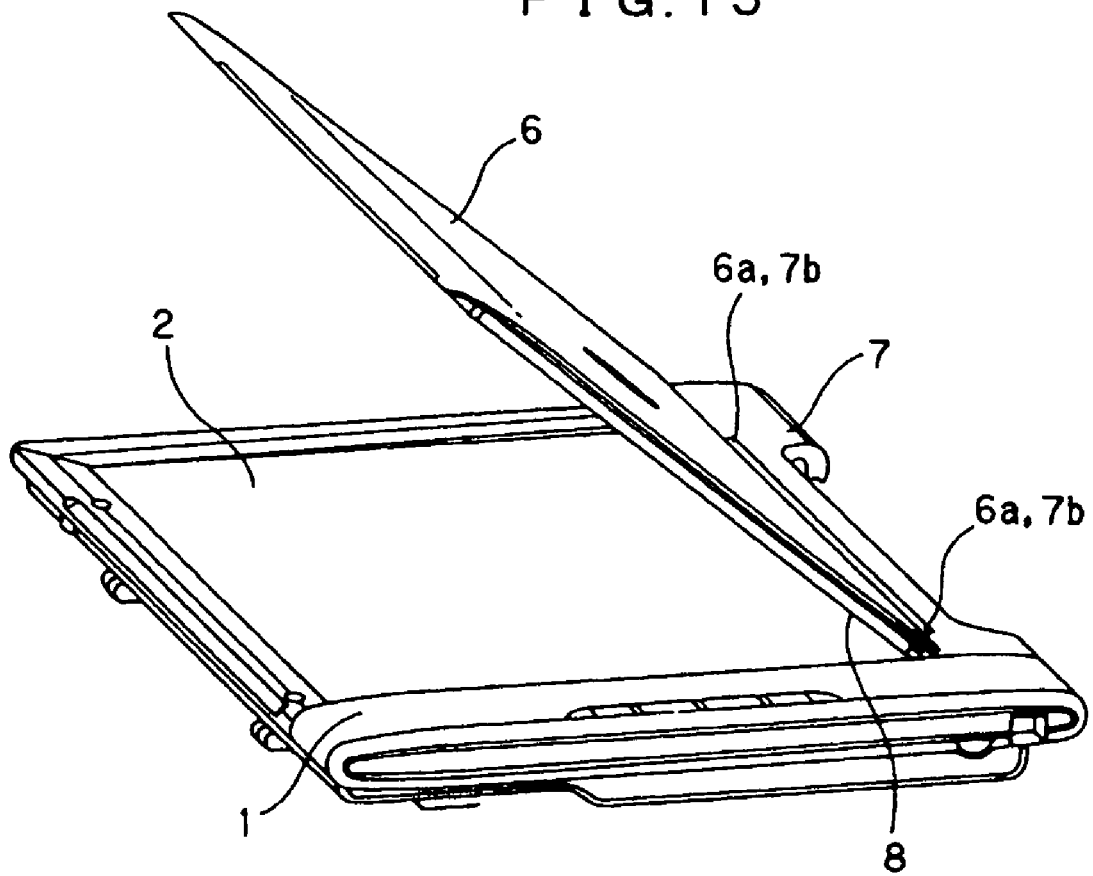
Figure 17:
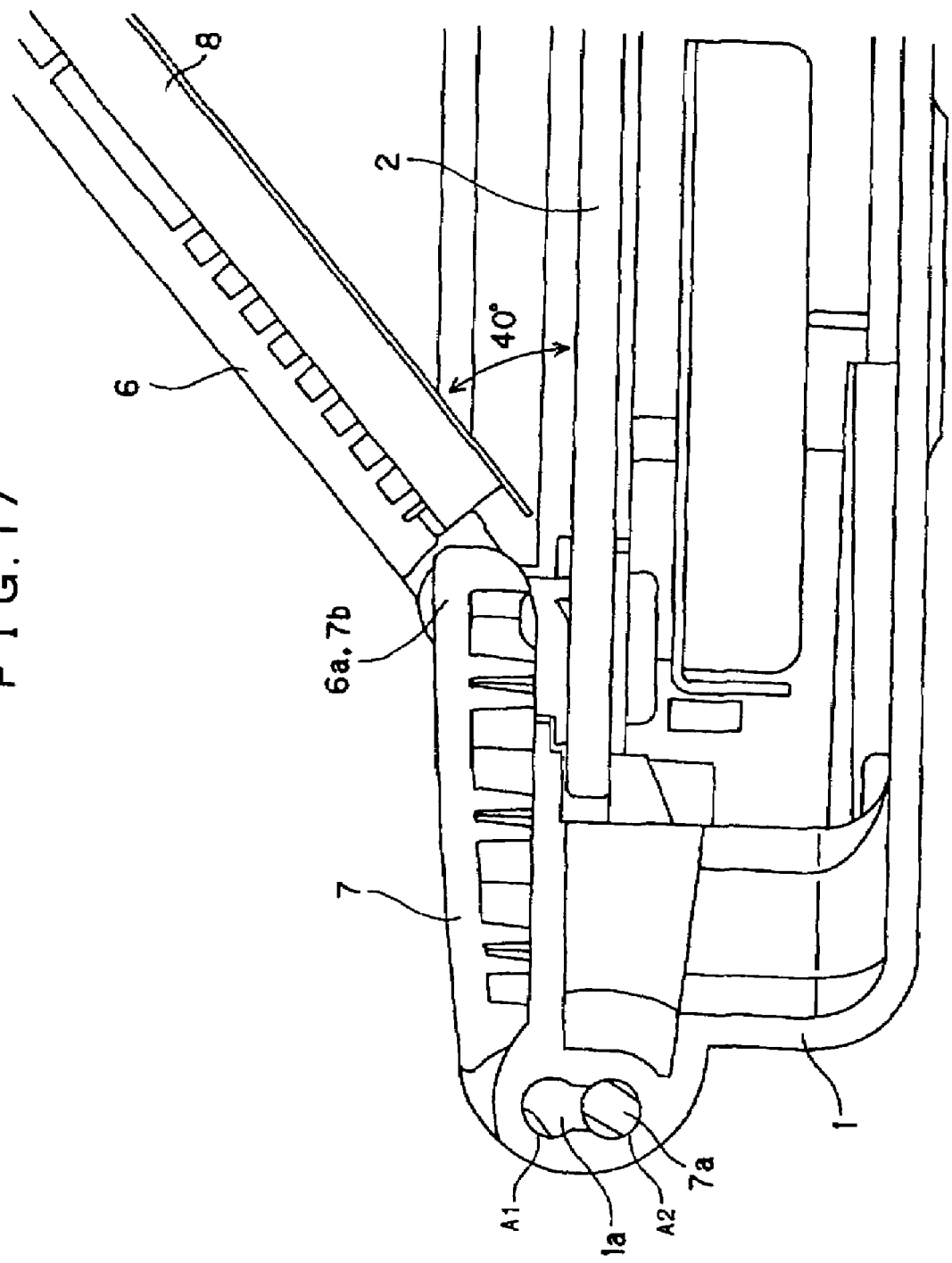
Figure 18:
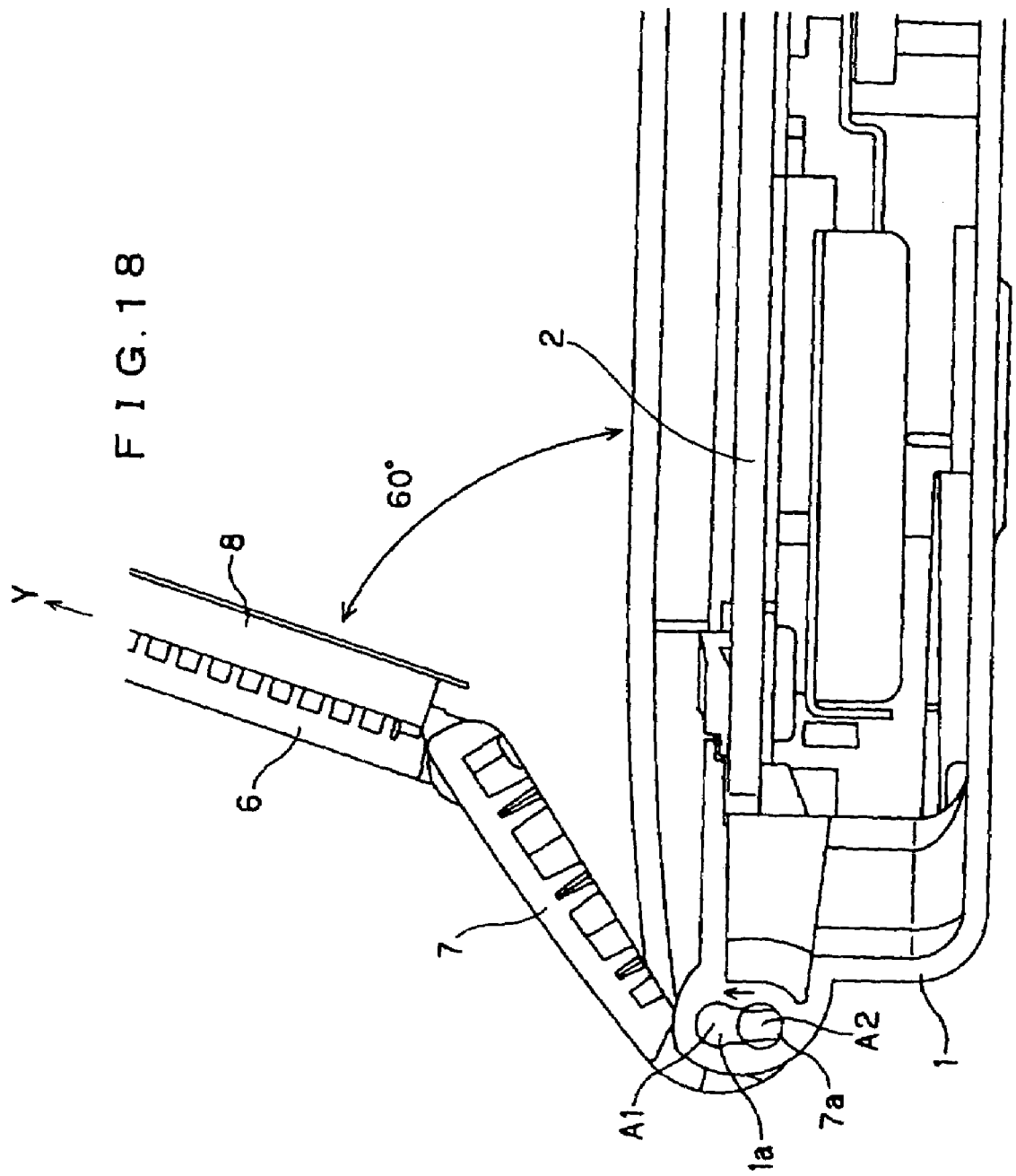

In case that the document cover 6 is opened by an operator (user) from the condition that the document cover 6 was closed, to the apparatus main body 1 as shown in FIG. 9, firstly, only the document cover 6 starts to be opened around the axis supporting portions 6a, 7b as pivots (see, FIGS. 15, 17).

After that, by pivot angle restriction protruding portions 18, 20 which were disposed on the document cover 6 and the hinge 7 shown in FIGS. 7, 8, a pivotal movement of the document cover 6 is stopped at the portion that it is opened by nearly 40° to the hinge 7 as shown in FIG. 21.

Even if an operator tries to open the document cover 6 more, the document cover 6 maintains the above-described angle of nearly 40° since a pivotal movement of the document cover 6 is restricted to the hinge 7.

On this account, the document cover 6 and the hinge 7 starts to be opened around the pivoting portion A2 as a pivot (axis) at a lower position of the concave portion 1a of the apparatus main body 1 (see, FIGS. 14, 17).

Further, when the document cover 6 is opened, at the place in which it is opened by nearly 100°, a protrusion 19 at a rear end of the hinge 7 is locked by a protrusion 17 of the apparatus main body 1 as shown in FIG. 22, and at this position, it is possible to imaintain the document cover 6 in the posture (condition) that it is opened to the apparatus main body 1.

On this account, an operator can set a document P, loosing a hand from the document cover 6 (see, FIG. 1). Here, the protrusion 19 of the hinge 7 and the protrusion 17 of the apparatus main body 1 configure a restriction portion which relates to the invention.

After that, when the document P is set and the document cover 6 is closed, the document cover 6 and the hinge 7 pivot in an integrated manner around the pivoting portion A2 as a pivot (see, FIGS. 14, 17) until the hinge 7 is completely closed on the apparatus main body 1, by balance of torque and gravity.

After that, this time, only the document cover 6 pivots around the axis supporting portions 6a, 7b as a center. By such opening and closing operations, a document press-contact sheet 8, which is disposed on the document cover 6 on the side of the document table glass 2, is attached firmly to a document, and the document P is properly fixed on the document table glass 2.

During a period of the above-described operation, the convex portion 7a simply pivots on the lower side of the concave portion 1a of the apparatus main body 1, i.e., at a position of the pivoting portion A2, since own weight of the hinge 7 is applied.

(Response to Thick Document)

Next, the case that a thick document D such as a book is set from the condition that an opened posture of the document cover 6 shown in FIG. 10 is maintained at such a position that an opening angle to the apparatus main body 1 is nearly 100° and the document cover 6 is closed will be described.

A closing operation of the document cover 6 and the hinge 7 is carried out, holding the condition that an angle relation at the time that they are opened each other is maintained, until the document cover 6 contacts the thick document D.

After the document cover 6 contacted the thick document D, postures of the document cover 6 and the hinge 7 are decided at the position in which balance is maintained depending on a height of the document D, as shown in FIG. 13.

At this time, it is designed in such a manner that the hinge 7 pivots freely within the range that its opening angle is nearly 0° through nearly 60°, depending on a thickness of the document D, and can press a thick document of approximately 25 mm at the maximum.

(180° Open)

As described above, on the occasion of opening the document cover 6, when an angle, which is formed with the hinge 7, exceeds nearly 40°, the hinge 7 also starts to pivot along with the document cover 6.

Figure 16:
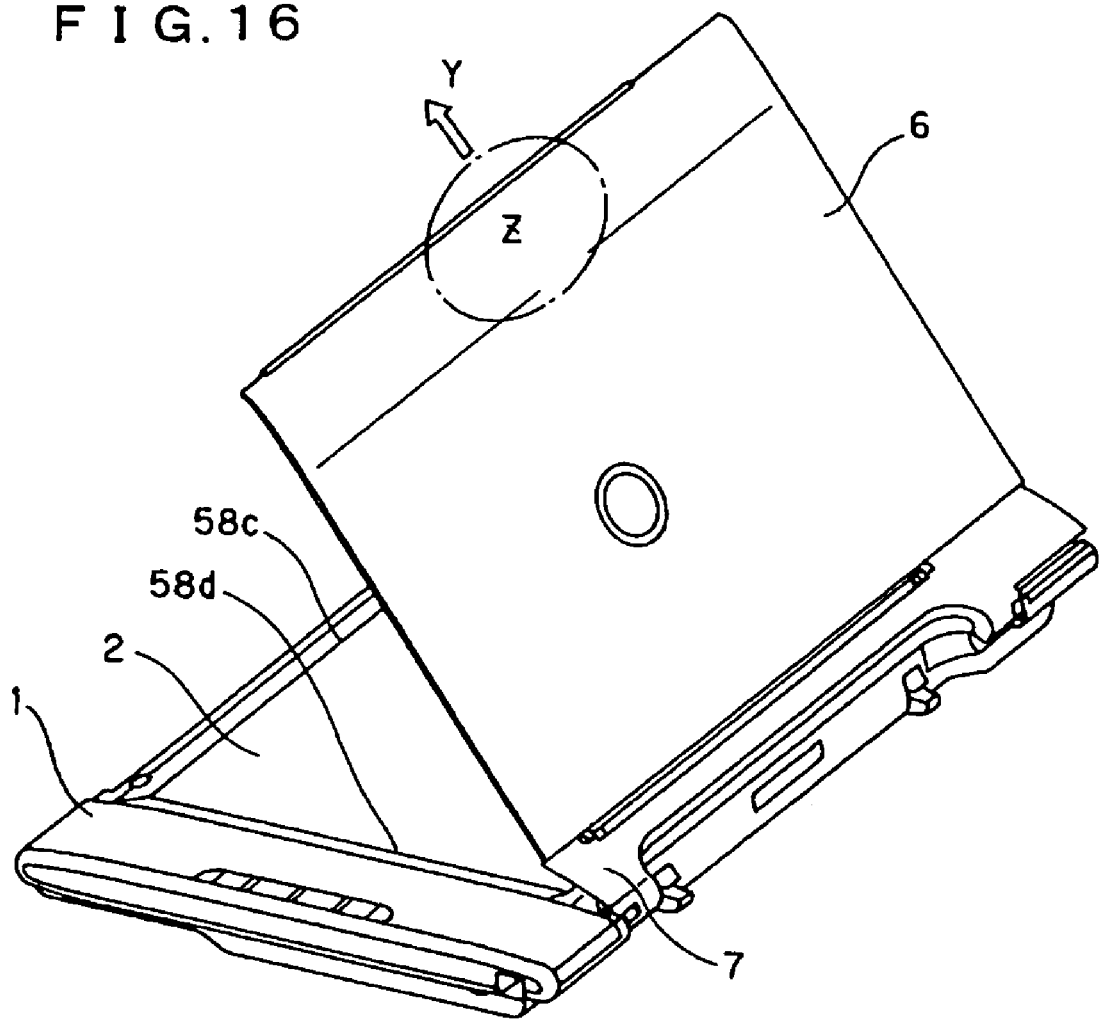

At the position that the cover is opened by nearly 60° (see, FIGS. 16, 18), a front end portion Z of the document cover 6 is lifted up in a direction of an arrow Y as shown in FIG. 16.

Figure 19:
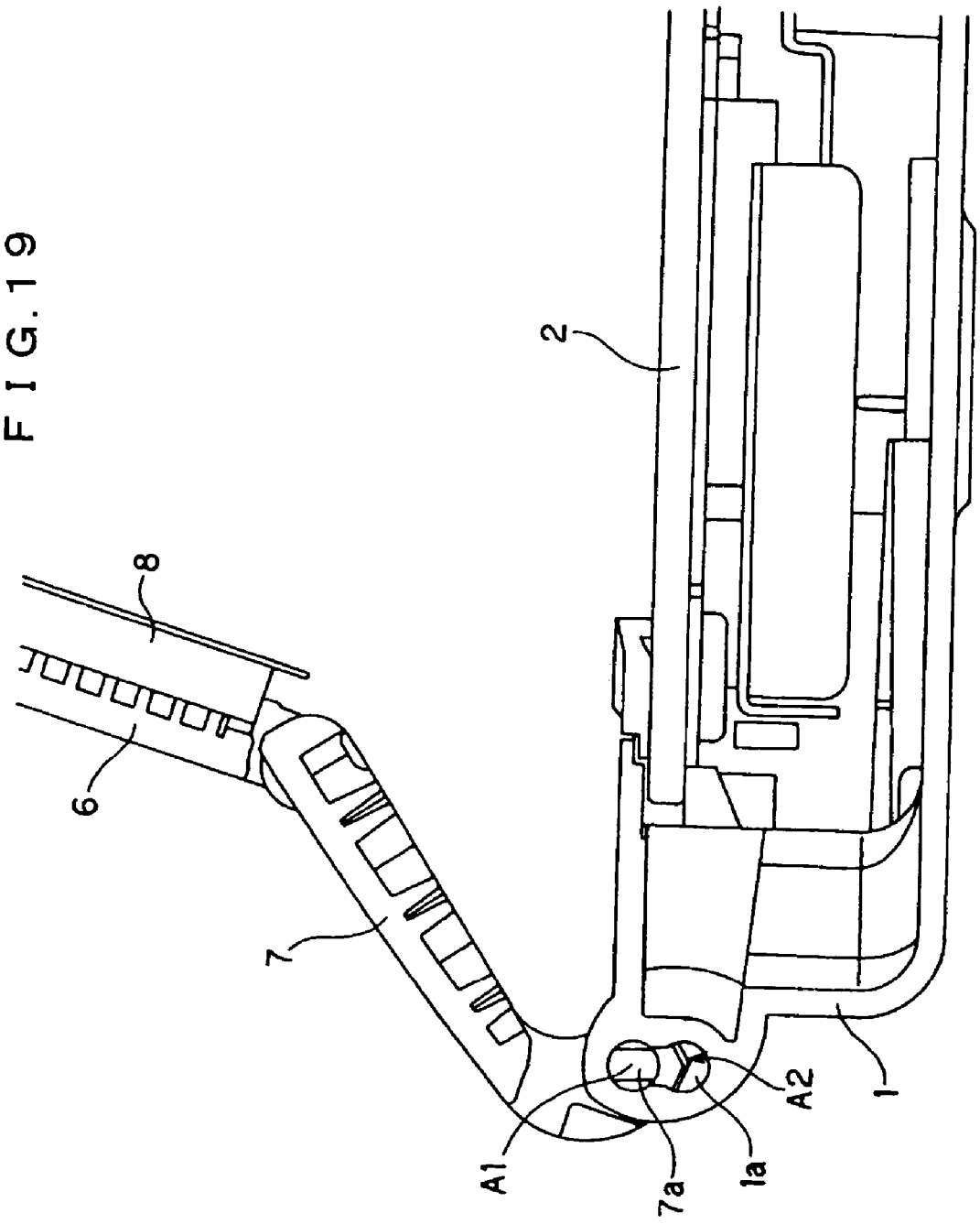

Then, along with this, the convex portion 7a at a rear end of the hinge 7 passes through the nearly gourd shaped constricted portion 1b of the concave portion 1a, which was disposed at a rear end portion of the apparatus main body 1, and moves from a lower position (FIG. 18) where the pivoting portion A2 is a fitting portion to an upper position where the pivoting portion A1 is a fitting portion (FIG. 19).

After that, when the document cover 6 pivots more, the convex portion 7a pivots at the pivoting portion A1 at the upper position of the nearly gourd shaped concave portion 1a as a pivot.

Figure 20:
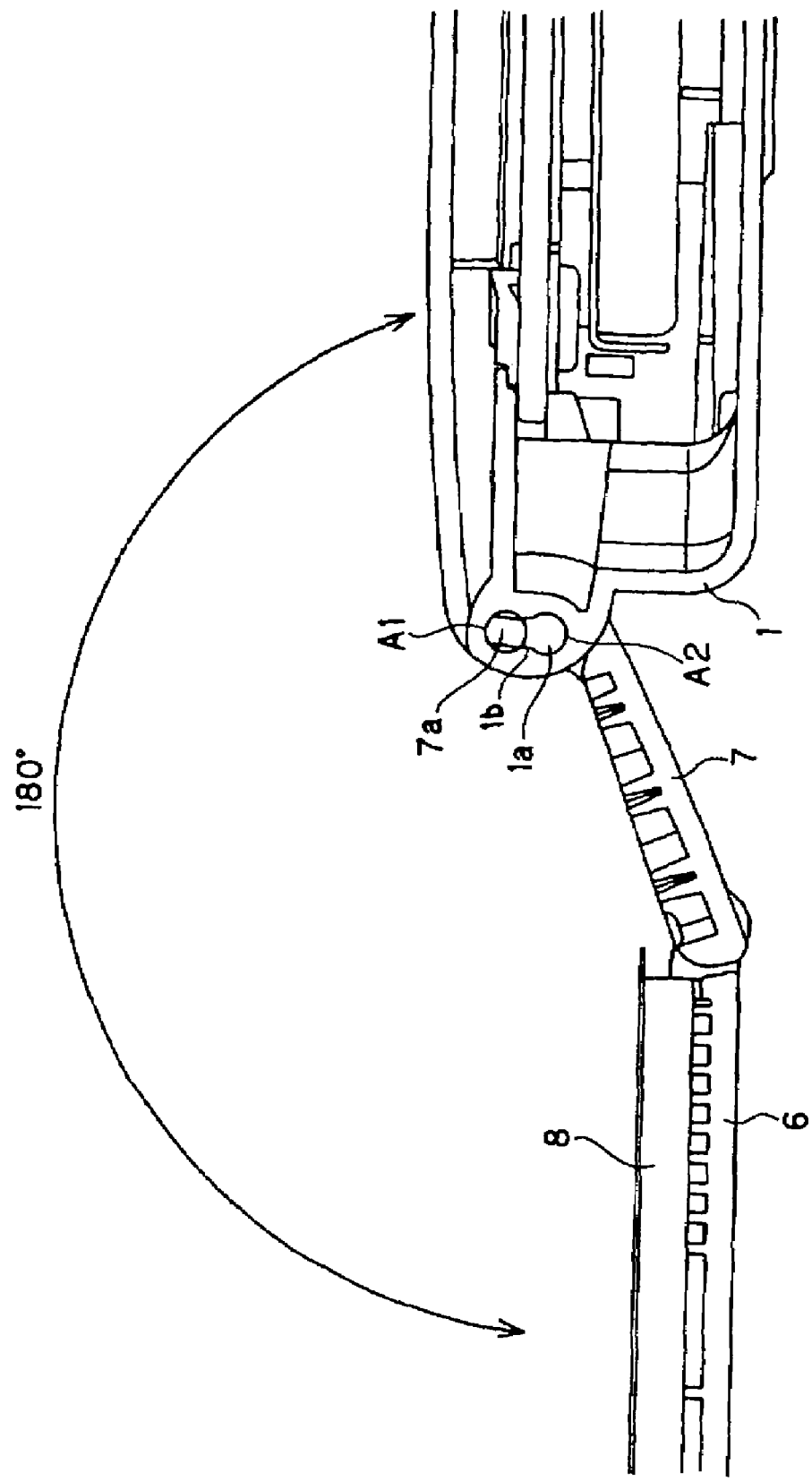

At this time, since the protrusion 19 moves to the upper side integrally with the axis 7a, even if it pivots, it is not locked by the protrusion 17 of the apparatus main body 1 (see, FIG. 23), and can pivot to a position of nearly 180° without change, as shown in FIGS. 11, 20.

Meanwhile, it is also all right even if restriction means for stopping the document cover 6 at the position of nearly 180° to the document table glass 2, but it is also all right even if an open position is set up by contacting an installation surface without disposing such restriction means.

This opening way is suitable for scanning of a larger document than the document table such as a map and a magazine, and it becomes possible to scan an arbitrary place of a large document without giving damage to a document.

In addition, on the occasion of closing the document cover 6 from this condition, it pivots around the pivoting portion A1 as a pivot until it is closed up to the condition that an opening angle of the document cover 6 to the apparatus main body 1 becomes nearly 60°.

Then, the convex portion 7a at a rear end of the hinge 7 passes through the constricted portion 1b of the nearly gourd shaped concave portion 1a which is disposed at a rear end portion of the apparatus main body 1, and thereby, it moves from the upper position A1 to the lower position A2.

At this time, it is better to configure in such a manner that the convex portion 7a at a rear end of the hinge 7 passes through the constricted portion 1b of the nearly gourd shaped concave portion 1a by own weights of the document cover 6 and the hinge 7.

After that, when the document cover 6 is closed, the convex portion 7a at a rear end of the hinge 7 pivots around the pivot A2 as a pivoting center at the lower position, and thereby, the document cover 6 comes into the condition that it is completely closed to the apparatus main body 1 as shown in FIG. 9.

By selecting any one of the above-described three opening ways, scanning of every document becomes possible, regardless of a thickness, a size, a type etc. of a document, and it means that operability is improved exponentially.

In addition, a magnet 21 is attached to a front end portion Z of the document cover 6 as shown in FIG. 1, and on the apparatus main body 1 which faces to the magnet 21, a metal member 22, to which the magnet 21 is sucked, is placed.

Meanwhile, an elastic member 8b, which is disposed integrally with the document press-contact sheet 8, has the thickness that it is smashed up to a certain degree, under the condition that the document cover 6 is closed and the magnet 21 is attached firmly to the document table glass 2.

On this account, when a document is placed on the document table glass 2 and the document cover 6 is closed, the document press-contact sheet is attached firmly to the document table glass 2 through the influence of a magnet 23.

At this time, the elastic member 8b of the document press-contact sheet 8 bends, and therefore, its pressure is applied to a document through the document press-contact sheet 8, and even if there are corrugation and curl on a document, they are stretched up, and the document is attached firmly to the document table glass 2.

This magnet 21 performs its advantage, especially at the time of such vertically placing in which a weight of the document cover 6 does not work on a document and it is slightly floated. Meanwhile, an explanation of the vertically placing will be described in detail in a configuration of a support structure which will be described later.

(Support Structure)

Figure 24:
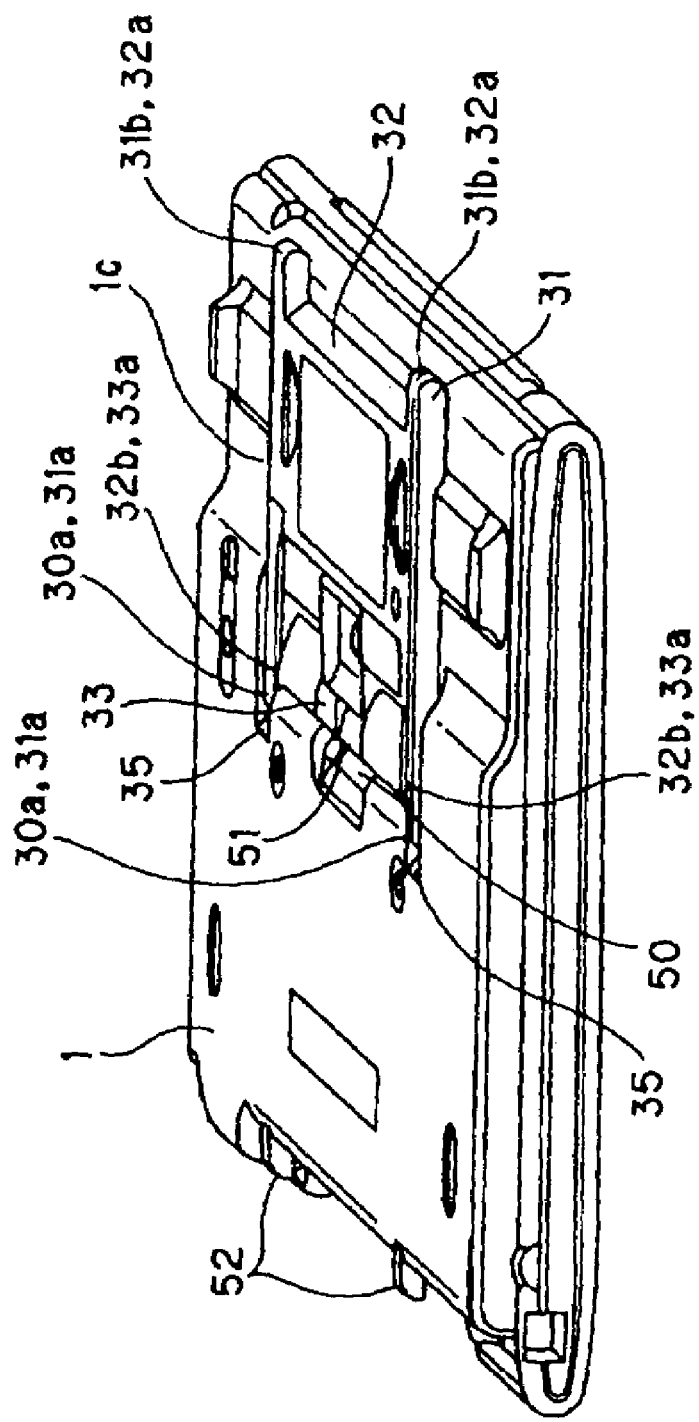
FIG. 24 is a view for explaining the condition that the support structure, which relates to the embodiment of the invention, is stored in a back surface of the apparatus main body.

Next, a support structure for holding an image reading apparatus in a vertically placed condition will be described. FIG. 24 is a view for explaining the condition that the support structure is stored in a rear surface of the apparatus main body 1, and FIGS. 25 through 28 are views for explaining an installation method of the support structure for installing the image reading apparatus in a vertically placed condition (at a vertically placed position).

Figure 29:
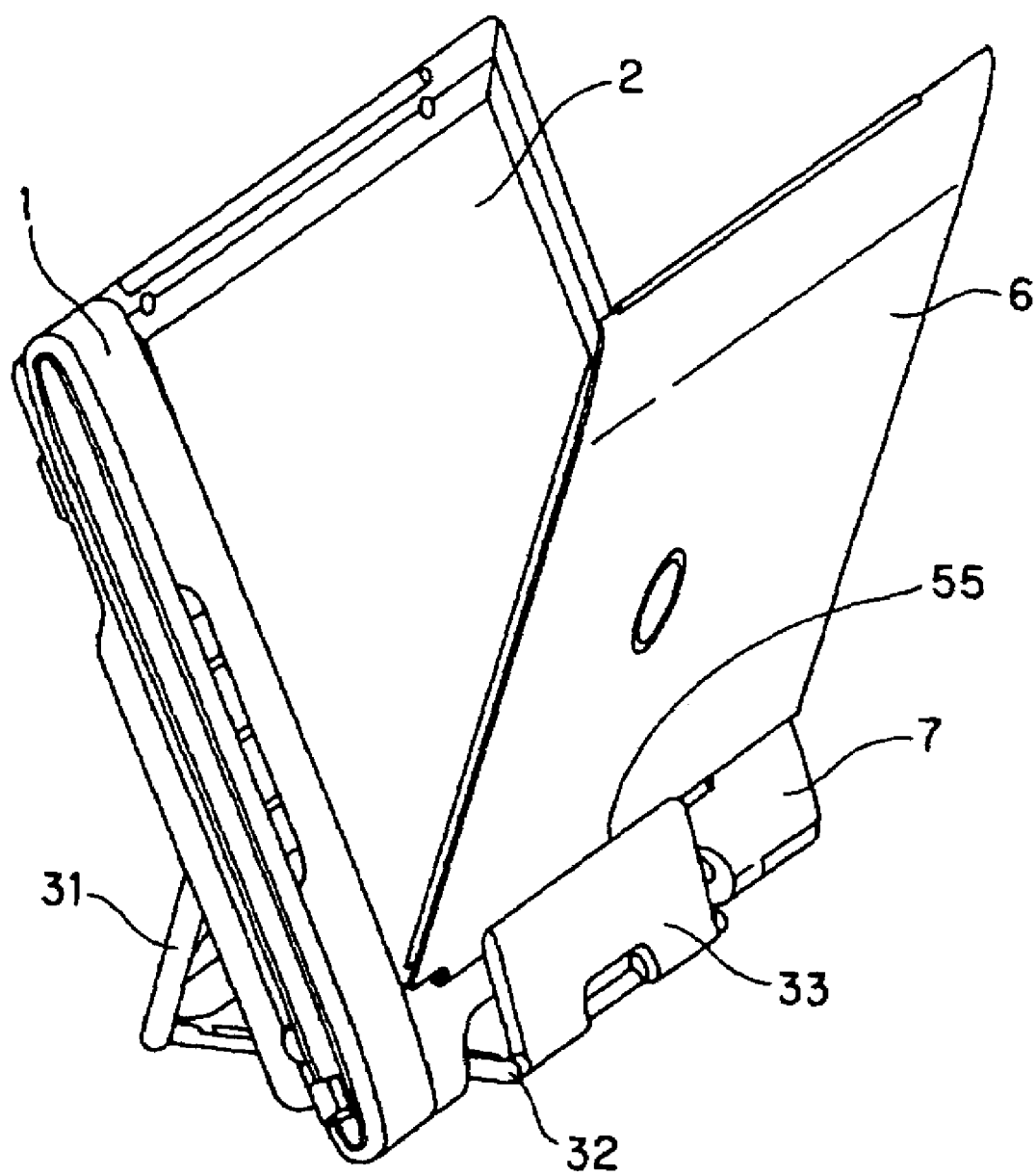
FIG. 29 is a view for explaining the condition that the document cover is opened, after the support structure, which relates to the embodiment of the invention, was installed in a vertically placed condition.

FIG. 29 is a view for explaining the condition that the document cover is opened after the support structure for installing the image reading apparatus in a vertically placed condition was placed.

As shown in FIG. 24, the support structure, which is stored in a storage portion 1c disposed in a bottom portion of the apparatus main body 1 in a horizontally placed condition, is configured by three components of a support structure L 31 as a first pivot member, a support structure M 32 as a second pivot member, and a support structure S 33 as a third pivot member.

Then, these three components are disposed in the form of inline pivotally each other, and folded to be stored in the storage portion 1c. Meanwhile, in case of using it in a horizontally placed condition (carrying out image reading), the support structure is in such a condition that it is stored in the apparatus main body 1.

Figure 30:
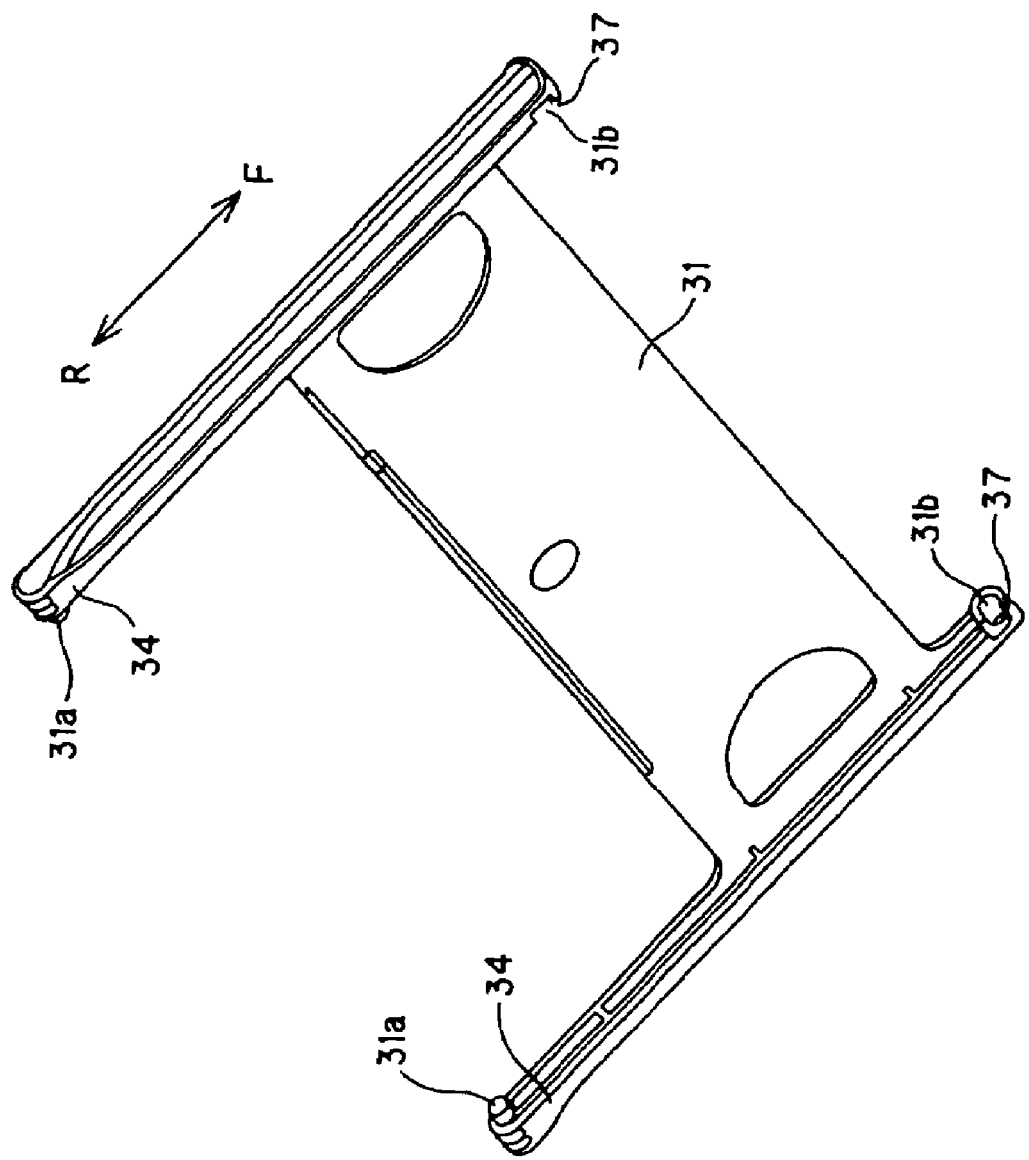
FIGS. 30 through 32 are views which show constituent members of the support structure that relates to the embodiment of the invention.
Figure 31:
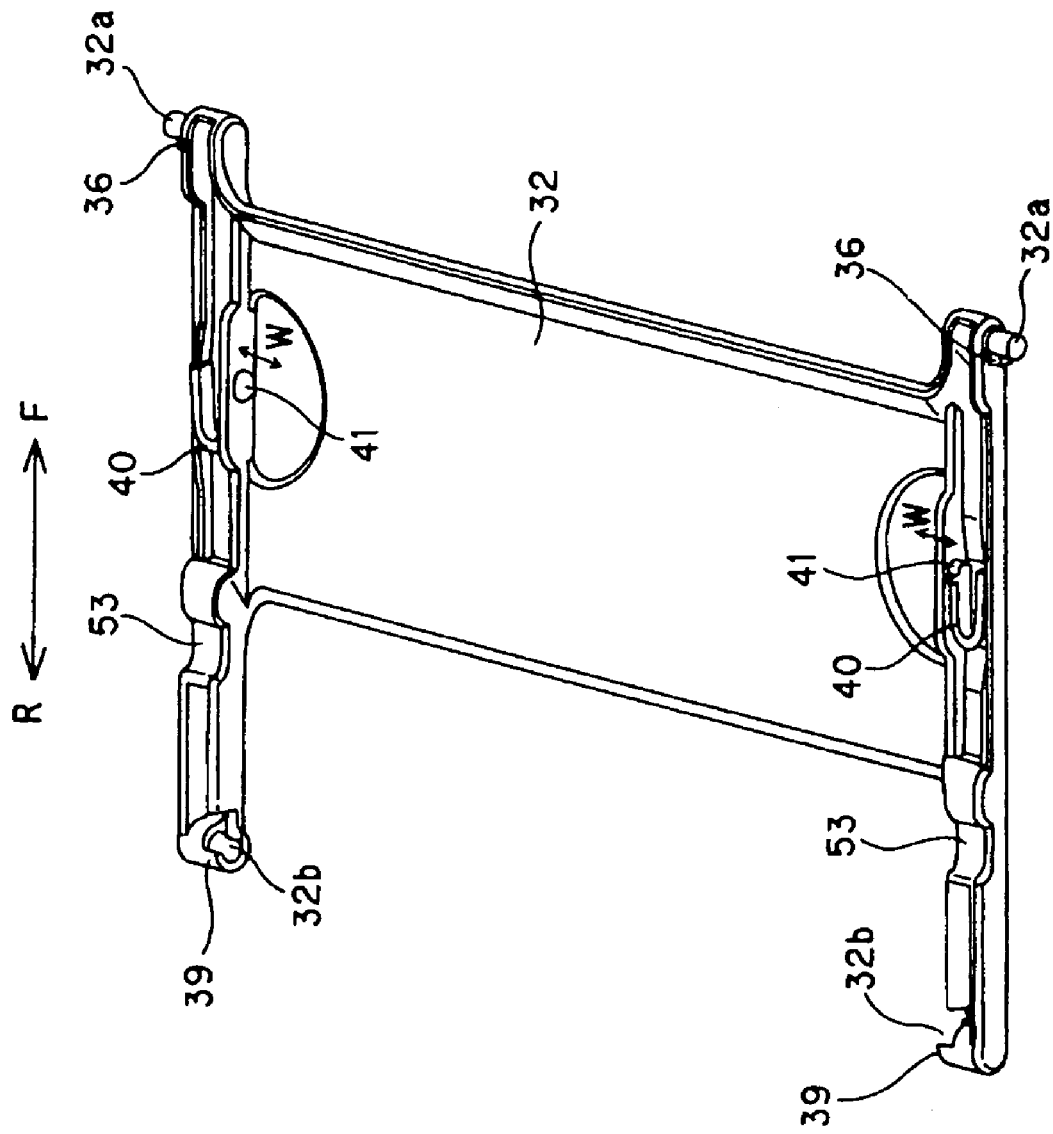
Figure 32:
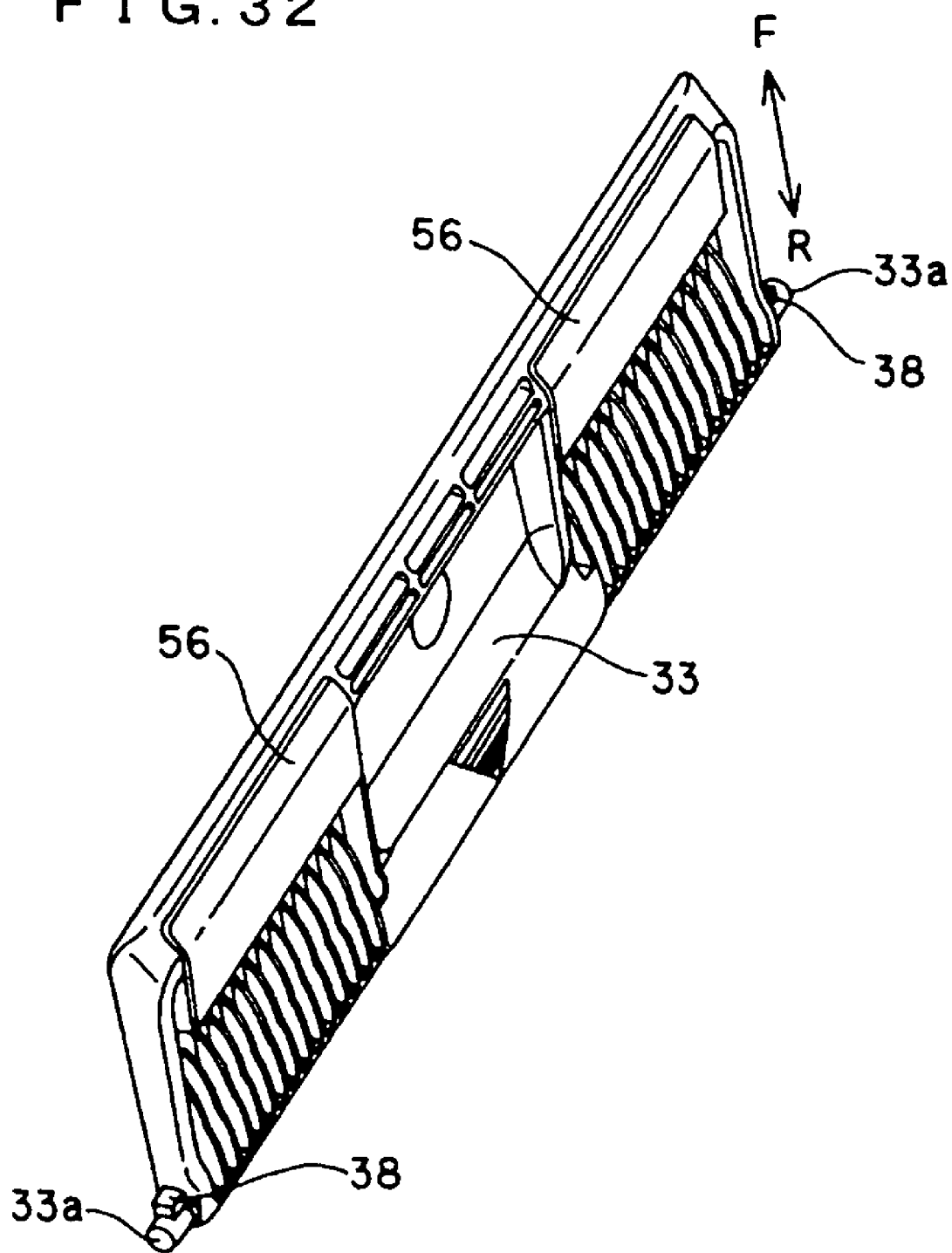

FIG. 30 is a view for explaining the support structure L 31, and FIG. 31 is a view for explaining the support structure M 32, and FIG. 32 is a view for explaining the support structure S 33.

Here, arrows (F, R) shown in FIG. 24 show forward and backward directions of the apparatus main body 1, in the same manner as the arrow shown in FIG. 9.

In FIGS. 30 through 32, arrows (F, R) shows forward and backward directions of the apparatus main body 1 in such a condition that respective support structures are stored in the apparatus main body 1 (see, FIG. 24).

Then, a convex portion 31a, which is disposed at one end portion of the support structure L 31 shown in FIG. 30 (on a rear end side under such a condition that it is stored in the apparatus main body 1), is connected in a pivotal manner with a concave portion 30a of the apparatus main body 1.

In addition, a concave portion 31b, which is disposed at the other end (on a front end side under such a condition that it is stored in the apparatus main body 1), is connected in a pivotal manner with a convex portion 32a which is disposed at one end portion of the support structure M 32 shown in FIG. 31 (on a front end side under such a condition that it is stored in the apparatus main body 1).

Further, a concave portion 32b, which is disposed at the other end portion of the support structure M 32 (on a rear end side under such a condition that it is stored in the apparatus main body 1), is also connected in a pivotal manner with a convex portion 33a which is disposed at an end portion of the support structure S 33 shown in FIG. 32 (on a rear end side under such a condition that it is stored in the apparatus main body 1).

A pivot angle of each of the support structure L 31, the support structure M 32 and the support structure S 33 is restricted by a relation of a protrusion and a groove for angle restriction, which are disposed as restriction portions in a convex portion (axis) and a concave portion (hole), respectively.

A pivot angle of the support structure L 31 is nearly 140° due to the fact that a receiving portion 34 contacts a receiving portion 35 of the apparatus main body 1.

A pivot angle of the support structure M 32 is nearly 80° due to the fact that a protrusion 36 contacts a receiving portion 37 of the support structure L 31.

In addition, a pivot angle of the support structure S 33 is nearly 70° due to the fact that a protrusion 38 contacts a receiving portion 39 of the support structure M 32.

In addition, an elastic member 40 shown in FIG. 31 is incorporated into the support member M 32 in such a manner that it can be removed so as to be operated in a W direction of the figure.

Figure 25:
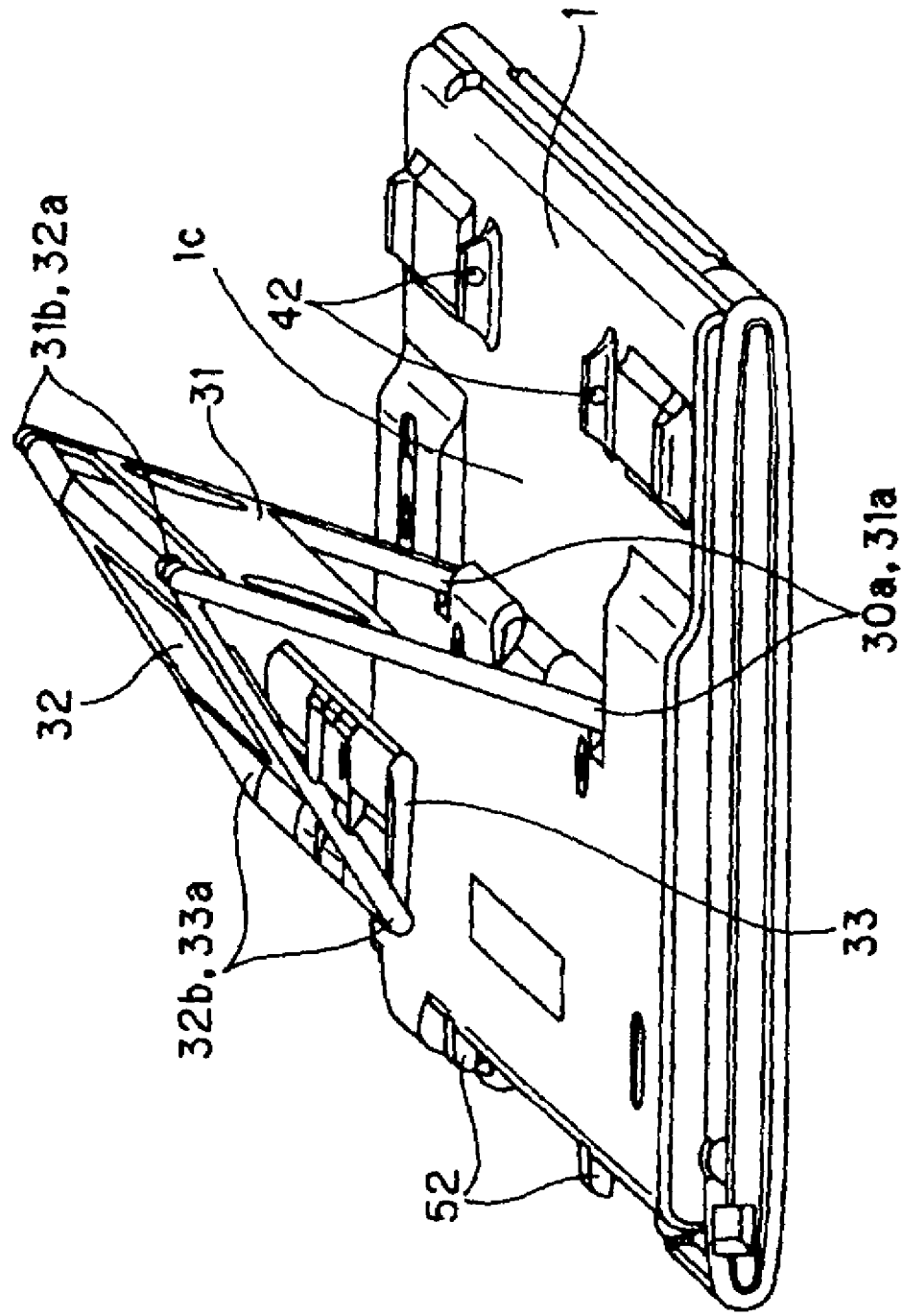

In a stored condition shown in FIG. 24, a protrusion 41 of this elastic member 40 falls down into a concave portion 42 which is disposed in the apparatus main body 1 shown in FIG. 25, and they are engaged, and thereby, its position is maintained.

Unless the elastic member 40 is separated from the concave portion 42 of the apparatus main body 1 on a mandatory basis, the support structure L 31, the support structure M 32 and the support structure S 33 are maintained in a stored condition shown in FIG. 24, by engagement of the elastic member 40 and the concave portion 42 of the apparatus main body 1.

Next, with reference to FIGS. 24 through 28, a method of installing the image reading apparatus in a vertically placed condition by use of the support structure will be described.

Figure 28:
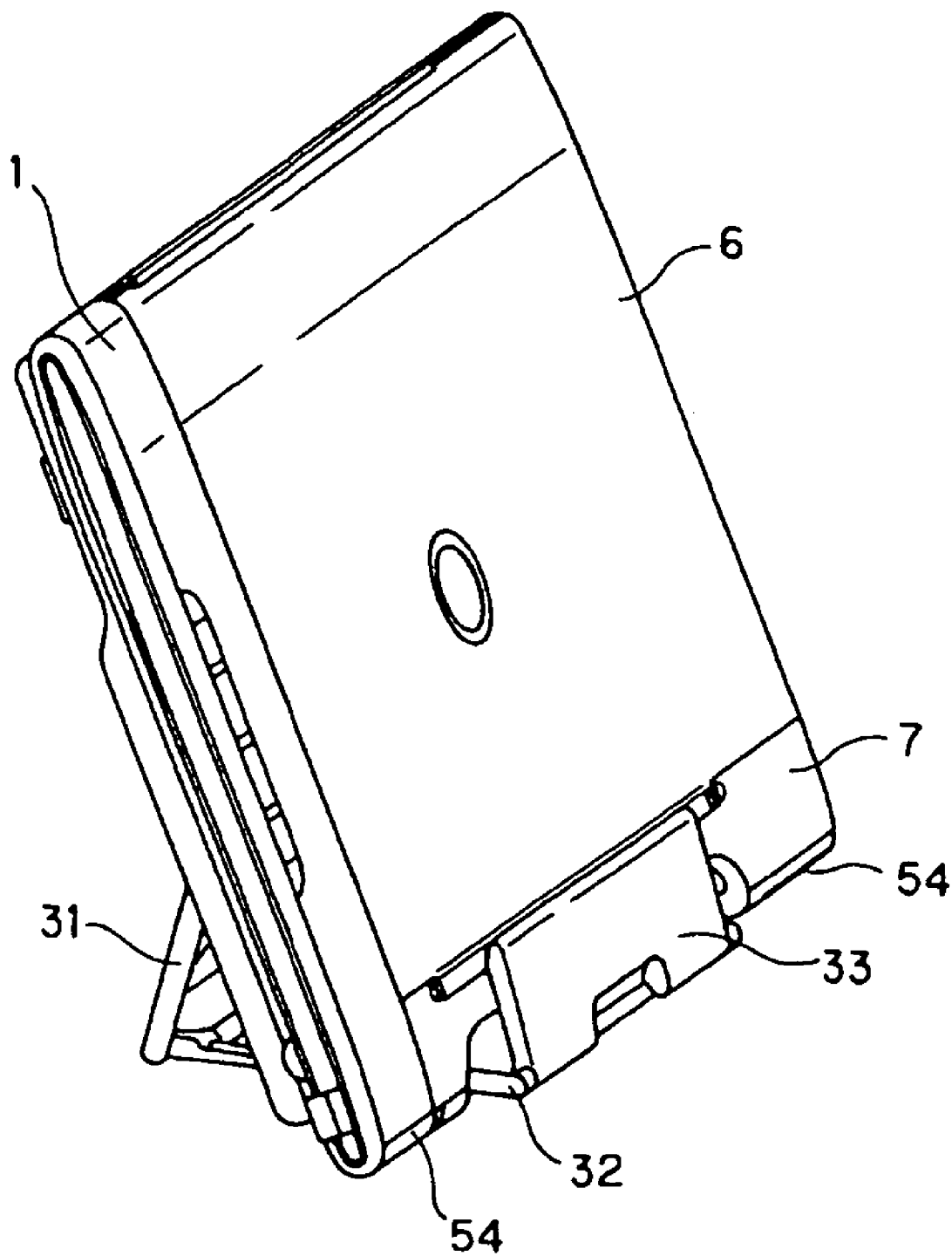

In order to change from the stored condition shown in FIG. 24 to a vertically placed condition shown in FIG. 28, firstly, an operator puts a finger into a concave portion 50 of the apparatus main body 1, and picks up a knob portion 51 of the support structure S 33.

By this operation, the above-described elastic member 40, which was incorporated in the support structure M 32, is released from the concave portion 42 which is disposed in the apparatus main body 1 (see, FIG. 25).

The support structure L 31, the support structure M 32, and the support structure S 33 turn around the above-described three turning axes as a center within a range of a pivot angle.

When each of them pivots by nearly the maximum pivot angle, the support structure S 33, which is located at the farthest end portion among the three support structures attached to the apparatus main body 1, reaches the position that it overrides the hinge 7, In sum, the support structure M 32 falls in such a condition that it pivots toward a front surface side (the document cover 6 side, the hinge 7 side) from a rear surface side of the apparatus main body 1, and the support structure S 33 is nearly located on a front surface side of the apparatus main body 1.

Figure 26:
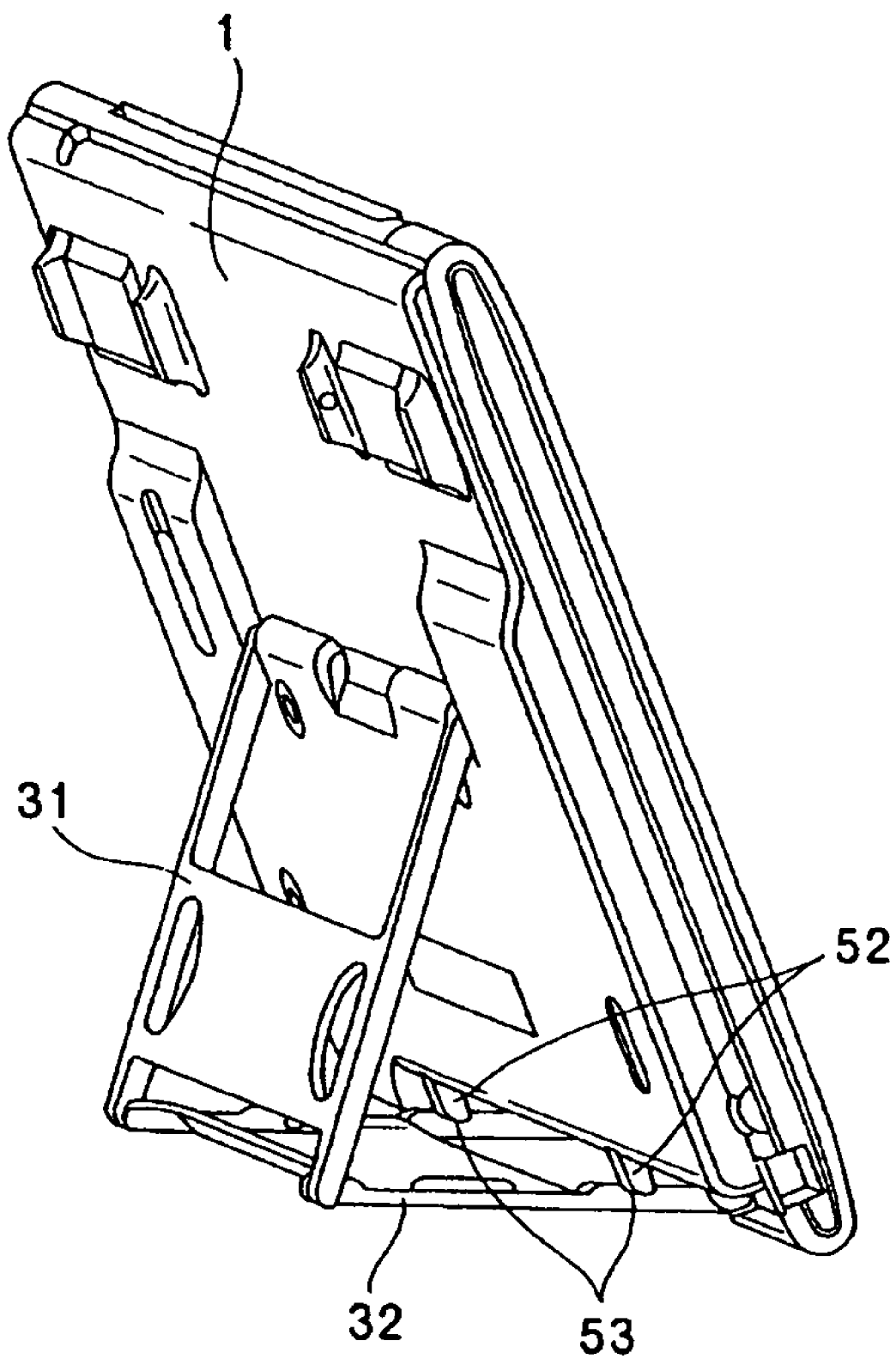

At this position, when a protrusion 52 of the apparatus main body 1 is engaged with (fitted with) a concave portion 53 of the support structure M 53, it is possible to build up the support structure on the apparatus main body 1 as shown in FIGS. 26 through 28.

In this condition, an outside surface of the support structure M 32 is placed on a nearly horizontal installation surface such as a desk (the support structure M 32 faces to the installation surface), and thereby, it is possible to install the image reading apparatus in a vertically placed condition as shown in FIG. 28.

That is, the apparatus main body 1 is to be placed on the installation surface through the support structure L 31 and the support structure M 32.

Here, the support structure L 31 and the support structure M 32 function as a supporting portion which supports the apparatus main body 1, and the protrusion 52 of the apparatus main body 1 and the concave portion 53 of the support structure M 32 function as a holding portion which holds the apparatus main body 1 in a vertically placed condition.

In addition, in case that the support structure is installed in a vertically placed condition, the support structure is locked at the position in which a receiving portion 55 (55a) of the support structure S 33 as a restriction portion presses a surface of the hinge 7 (upper surface in a horizontally placed condition).

In addition, by engagement of the protrusion 52 and the concave portion 53, the support structure and the apparatus main body 1 are positioned, and therefore, the hinge 7 is to be fixed in such a condition that it is attached firmly to the apparatus main body 1.

Here, the support structure S 33 and the support structure M 32 function as a holding portion.

Meanwhile, in this embodiment, the support structure S 33 functions as a holding portion, but even in case that the support structure S 33 is not disposed, it is possible to function the above-described protrusion 52 of the apparatus main body 1 and the concave portion 53 of the support structure M 32 as a holding portion. On one hand, the document cover 6 is configured pivotally to the hinge 7 around axis supporting portions 6a, 7b as a supporting point.

Here, in case that the document cover 6 turns around the axis supporting portions 6a, 7b as a supporting point, the document cover 6 is to be restricted by the hinge 7 at the position that it is opened by nearly 40° to the hinge 7, as described above. In this embodiment, as shown in FIG. 29, a receiving portion 55 (55b), which receives (supports) the document cover 6 at the position that the document cover 6 is opened by nearly 40° to the hinge 7, is disposed on the support structure S 33.

By this means, it is possible to determine an opening angle of the document cover 6 in a vertically placed condition, and it is possible to prevent a stress from being concentrated on the axis supporting portions 6a, 7b due to own weight of the document cover 6.

Meanwhile, in case that a stress to be concentrated on the axis supporting portions 6a, 7b does not become a problem, it is also all right even if an opening angle of the document cover 6 in a vertically placed condition is determined by a restriction portion between the document cover 6 and the hinge 7, without disposing the receiving portion 55 (55b) which receives the document cover 6, on the support structure S 33.

In addition, on a portion in the support structure S 33 which contacts at least the hinge 7 and the document cover 6 (it may be a portion which has a possibility of contacting), a high friction elastic member 56 is disposed, as shown in FIG. 32.

Figure 33:
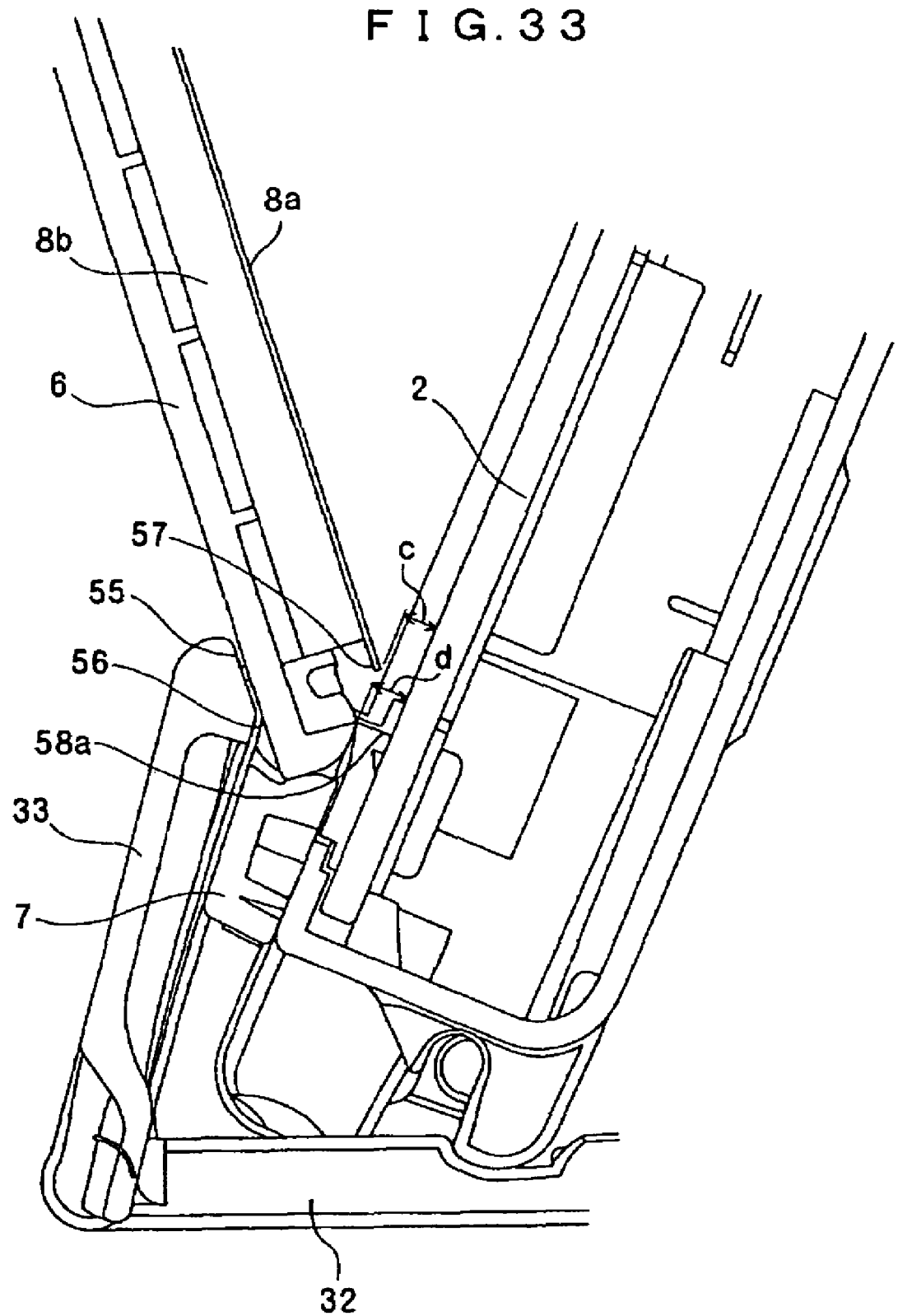
FIG. 33 is an enlarged view of a substantial part of the image reading apparatus which is shown in FIG. 29.

This high friction elastic member 56 is disposed to be slightly higher than the receiving portion 55 of a main body of the support structure S 33 on the hinge 7 and the document cover 6 side of the support structure S 33 in a vertically placed condition as shown in FIGS. 32, 33, and therefore, there is not the case that the support structure S 33 directly contacts the hinge 7 and the document cover 6.

Therefore, it is possible to prevent the hinge 7 and the document cover 6 as external appearance components from getting bruise and taint. In addition, it is possible to prevent sounds due to collision of the document cover 6 and the support structure S 33 on the occasion that the document cover 6 is opened from being generated.

Here, as a material of the high friction elastic member 56, urethane, EPDM (ethylene-propylene rubber), silicon etc. are desirable, and as a degree of hardness, Hs (Shore hardness) =30 through 70 degrees is desirable. On one hand, at the time of a reading operation in the support structure stored condition shown in FIG. 24, i.e., in a horizontally placed condition, at least a part of the high friction elastic member 56 is to be located on a bottom surface (rear surface, back surface) of the apparatus main body 1.

In this condition, the high friction elastic member 56 is configured so as to be also located on the lowermost surface of the apparatus main body 1, and in addition to the above-described functions (prevention of bruise and taint, prevention of abnormal sounds), furthermore, it also functions as an anti-slip member for an entire image reading apparatus on the occasion of horizontally placing.

Meanwhile, it is desirable that the support structure is disposed integrally with the apparatus main body 1, but, without limiting to this, it is also all right even if it is disposed in a detachable manner to the apparatus main body 1.

Next, the press-contact sheet 8, which is provided on the document cover 6 and presses a document set on the document table glass 2, will be described.

The press-contact sheet 8 in this embodiment is configured so as to guide a document to a predetermined position on the document table glass 2, in a vertically placed condition of the image reading apparatus as shown in FIG. 29.

As shown in FIG. 33, in case that the document cover 6 is opened in a vertically placed condition of the image reading apparatus, the document cover 6 turns around a fitting portion of the concave portion 7b at a front end of the hinge 7 and the convex portion 6a at a rear end portion of the document cover 6 as a supporting point.

By the protrusion 18 of the document cover 6, the protruded portion 20 of the hinge 7 and the receiving portion 55 (high friction elastic member 56) of the support structure S 33, its pivot angle is restricted, and its posture is maintained at the position that it is opened by nearly 40° to the hinge 7.

At this time, an end portion 57 (an end portion on the hinge 7 side of the press-contact sheet 8), which becomes the lowerinost portion of the press-contact sheet 8 in a vertically placed condition of the image reading apparatus, is disposed so as to be located in the vicinity of a step 58a (see, FIG. 10).

Here, the step 58a is a step which is disposed on a rear end side (hinge 7 side) in forward and backward directions (transverse direction) among steps 58 (58a, 58b, 58c, 58d) which are disposed between the apparatus main body 1 and the document table glass 2.

The step 58a is one to which a document is struck in case that the document is placed on the document table glass 2 and which functions as a positioning portion (struck portion) of a document on the document table glass 2.

Figure 36:
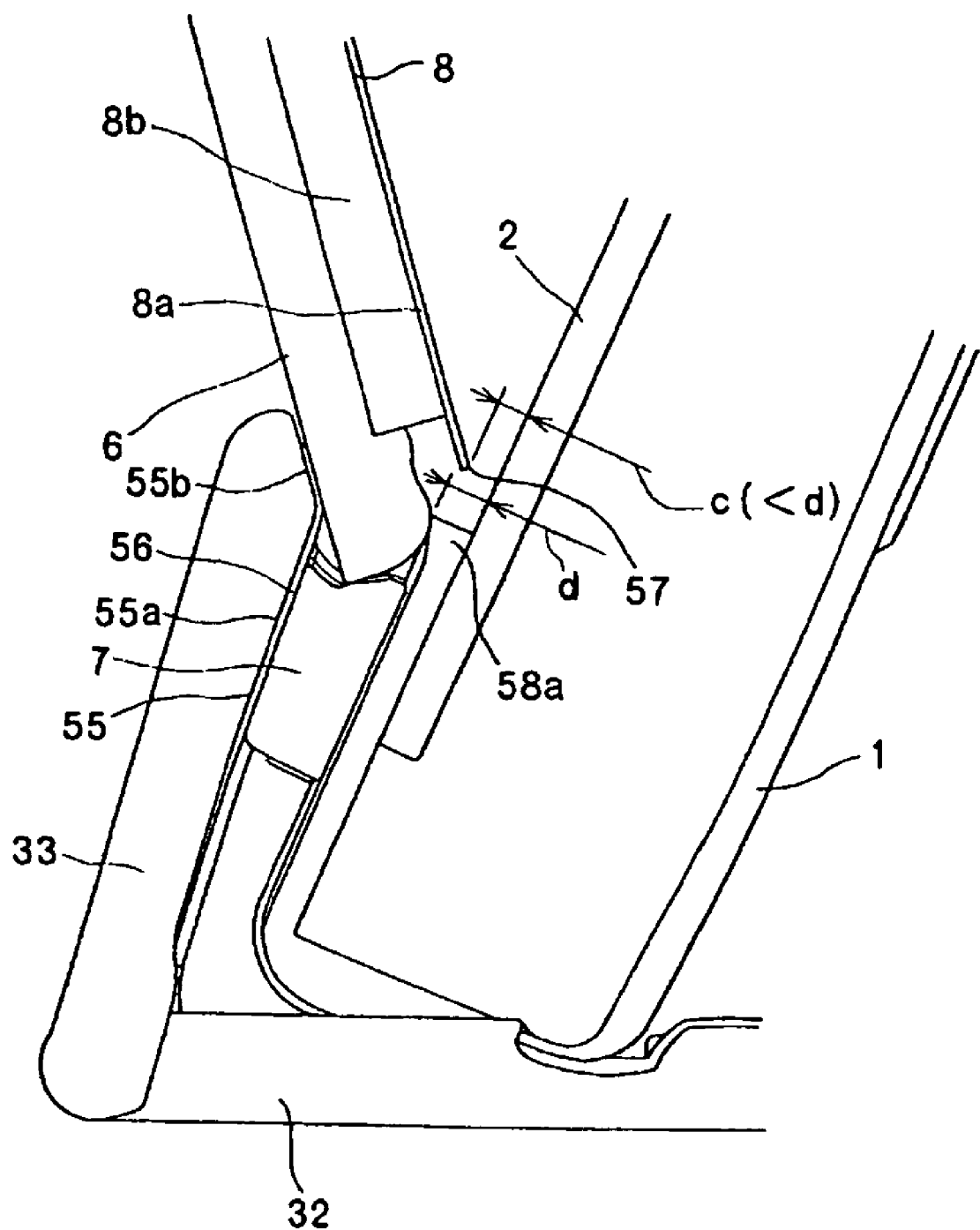
FIG. 36 is an enlarged view of a substantial part of the image reading apparatus which is shown in FIG. 33.

FIG. 33 is a schematic cross-sectional view which represents the vicinity of this step 58a in detail. FIG. 36 is an enlarged view of a substantial part of the image reading apparatus shown in FIG. 33.

As shown in FIG. 33, under such a condition that the document cover 6 is opened by nearly 40° to the hinge 7 in a vertically placed condition of the image reading apparatus, a distance c between the document table glass 2 and the lowerinost portion 57 of the sheet member 8a is configured so as to be smaller than a step d of the step 58a and to realize c<d.

By the above-described configuration, in case of setting a document from an upper side in a vertically placed condition of the image reading apparatus, an edge (front edge) of the document is to be necessarily reached to the step 58a along (through the guidance of) the press-contact sheet 8 or the document table glass 2.

That is, even if a document is made to fall down freely from a certain level of a height, an edge of the document reaches the step 58a through the guidance of the press-contact sheet 8 or the document table glass 2.

On this account, eliminated is the necessity that an operator holds a document until an edge of the document contacts the step 58a of the apparatus main body 1 on the occasion of setting the document.

Therefore, it is possible to carry out document setting easily and accurately.

Further, no matter how strongly a document is crooked, it reaches the step 58a through the guidance of the press-contact sheet 8 or the document table glass 2, and therefore, it is possible to strike it to the step 58a more accurately, and more accurate document setting becomes possible, and it is possible to exponentially improve operability, (Configuration of Document Struck Portion of Document Table)

Between the document table glass 2 and a rim of an opening portion of the apparatus main body 1 in which the document table glass 2 is incorporated, the steps 58 (58a, 58b, 58c, 58d) are disposed as described above (see, FIGS. 10, 16).

Here, the opening portion, in which the document table glass 2 is incorporated, is disposed in the shape of a nearly rectangle in tune with a document, and the steps 58a, 58b, 58c, 58d configure four sides of the rectangle. Among the steps 58, two steps 58a, 58b, which are nearly orthogonal, become a document positioning member for deciding a document reading start position in a main scanning direction and a sub scanning direction, on the occasion of placing a document on the document table glass 2.

The step 58a is located at the lowermost portion in case that the above-described support structure comes into a vertically placed condition, and therefore, it is desirable that it has a height sufficient for receiving a document which falls down due to gravity.

On that account, in this embodiment, the step 58a is set up to a height of nearly 3 mm from a glass surface of the document table glass 2.

On one hand, on the occasion of reading out a large document such as a map, it is desirable that floating of a document due to the step is as small as possible, i.e., it is desirable that the step 58 is as small as possible.

On that account, in this embodiment, the step 58c, which is located at a position facing to the step 58a which becomes the document positioning member in the vicinity of the hinge 7, is set up to a height of nearly 0.5 mm from the document table glass 2. Then, two steps 58b, 58d, which are orthogonal to the above-described two steps 58a, 58c, respectively, are configured in such a manner that a height is changed gradually from a height of nearly 3 mm to a height of nearly 0.5 mm so as to prevent a step from being formed at a rim of the opening portion as shown in FIG. 10.

By this means, it is possible to eliminate an unnecessary step having the possibility that it becomes a cause for exerting a bad influence to a read image and doing damage to a document, as much as possible.

By realizing such step configuration, it is possible to surely receive a document which is set at the time of a vertically placed condition of the image reading apparatus, and it is also possible to improve a reading performance of a large document such as a map.

(Pressure Fastening Sheet Configuration)

Figure 34:
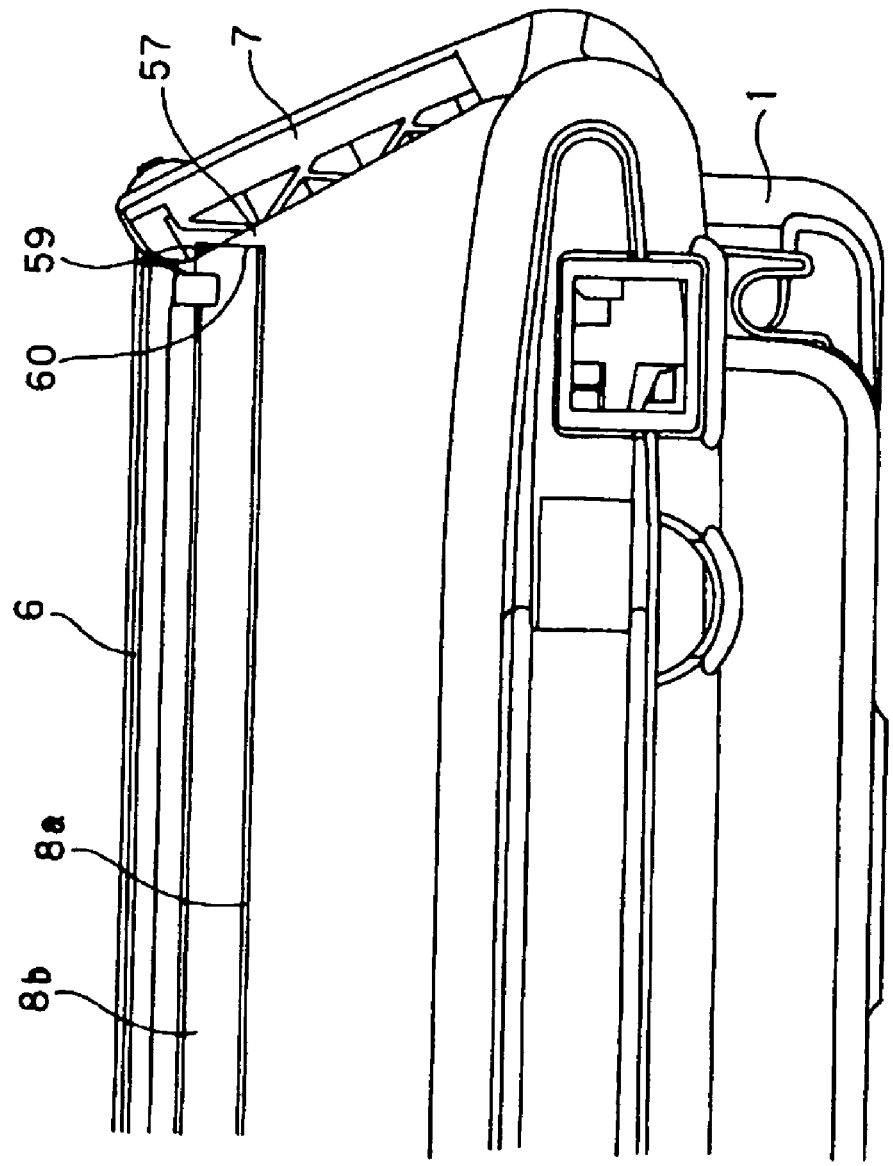
FIG. 34 is a view for explaining a relation of a press-contact sheet and the hinge in the case that only the hinge is opened by 60 degrees.
Figure 35:
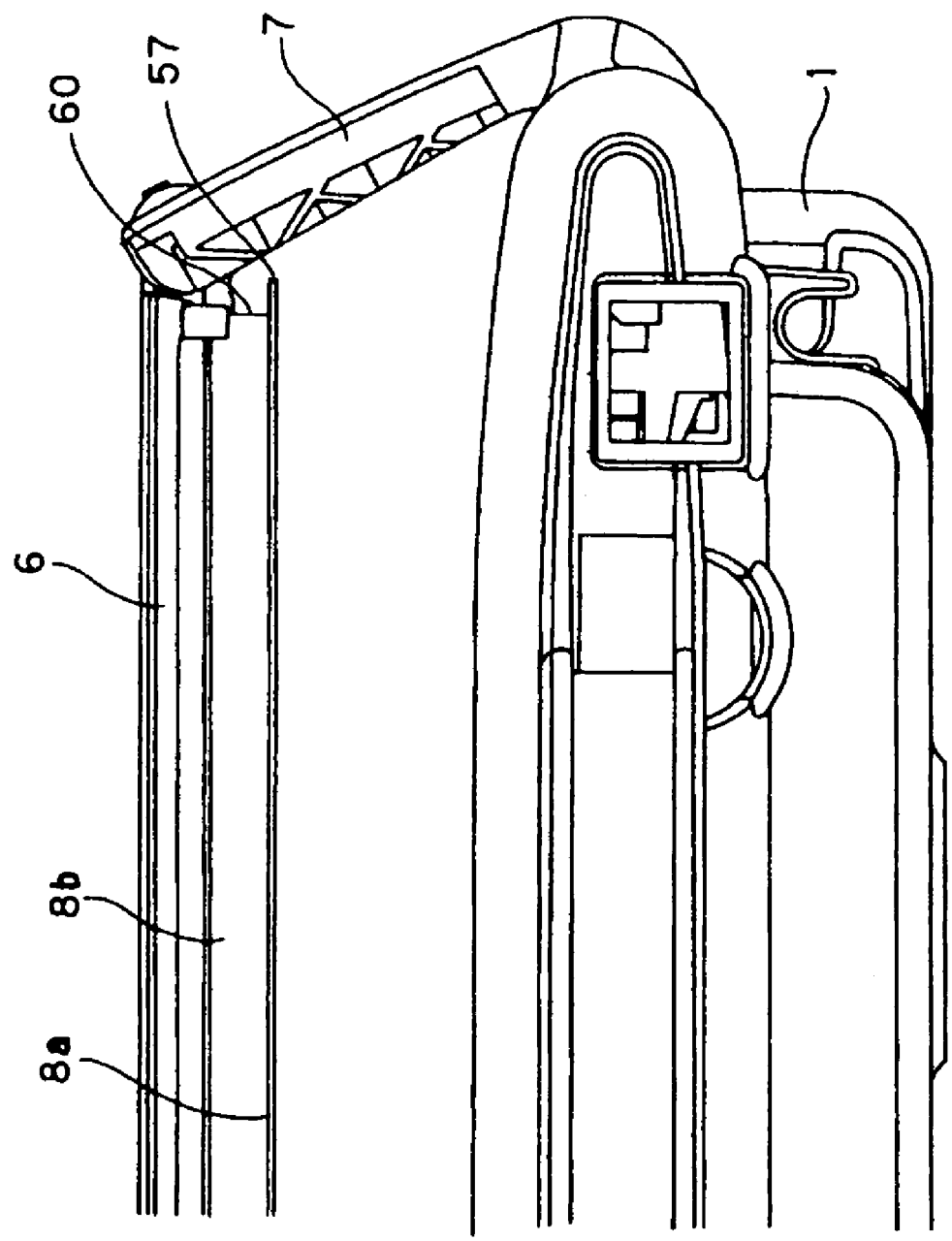
FIG. 35 is a view for explaining a relation of the press-contact sheet and the hinge in the case that only the hinge is opened by 60 degrees in the embodiment of the invention.

FIG. 34 is a view for explaining a relation of the press-contact sheet and the hinge in case that only the hinge is opened by 60 degrees, and FIG. 35 is a view for explaining a relation of the press-contact sheet and the hinge in case that only the hinge is opened by 60 degrees in the embodiment of the invention.

It is desirable that the press-contact sheet 8, which is incorporated in the document cover 6, mainly presses a thin document from an upper side and in case that there are corrugation and curl on the document, it sets them straight, and has the document firmly attached to the document table glass 2, and it prevents extra outside light, which is not irradiation light of a reading apparatus, from entering into a document. On that account, the press-contact sheet 8 is configured so as to be able to cover over a document in the largest possible range. A commonly used press-contact sheet is incorporated in a document cover at a position which is almost the closest to a rim of the opening portion in which the document table glass 2 is incorporated as described above, i.e., with a size slightly smaller than the opening portion.

By realizing such configuration, it becomes the configuration that it is easy to realize a relation of (a distance c between the document table glass 2 of the apparatus main body 1 and the end portion 57 of the lowermost portion of the press-contact sheet 8)<(a step (a height from the document table glass 2) d of the step 58a)

at the time of placing a document in the vertically placed condition as described above.

On one hand, when a thick document D such as a book is placed on the document table glass 2 and the document cover 6 is closed, the document cover 6 is bent on the lower side due to its own weight, centering on the axis supporting portions 6a, 7b between it and the hinge 7, and becomes the posture that the press-contact sheet 8 presses the thick document D, as shown in FIGS. 12,13.

In this posture, the posture is maintained at the position that an opening angle of the document cover 6 to the apparatus main body 1 is nearly 0°.

In such case, the press-contact sheet 8, which is configured by a sheet member 8a and an elastic member 8b such as sponge, turns around a fitting portion of the concave portion 1a which is disposed at a rear end portion of the apparatus main body 1 and the convex portion 7a at a rear end of the hinge as a turning center, as shown in FIG. 34.

Then, it is concerned that the elastic member 8b knocks up against the hinge 7 (shaded portion 59) while the hinge 7 turns by a certain angle or more, within a pivot angle range.

This is considered to be because the press-contact sheet 8 is located at a portion which is almost the closest to a rim (step 58a) of the opening portion as described above, and further, an end portion 60 of the elastic member 8b in the vicinity of the hinge 7 is disposed at almost the same position as the end portion 57 of the sheet member 8a in the vicinity of the hinge 7.

In order to avoid this, it is conceivable that, a fitting portion (turning center) of the concave portion 1a which is disposed at a rear end portion of the apparatus main body 1 and the concave portion 7a at a rear end of the hinge is shifted to the back side of the apparatus, without changing positions of the axis supporting portions 6a, 7b, and a turning angle of the hinge 7 is reduced, to avoid interference.

Alternately, it is conceivable that the end portion 57 of the sheet member 8a is separated from the step 58a which becomes the document positioning member.

However, in such method, there occurs bad effects such as size growing of the apparatus (in case of the former), a bad influence to a read image and degradation of a document placing performance at the time of vertically placing (in case of the latter).

Then, in this embodiment, the elastic member 8b is shortened rather than the sheet member 8a as shown in FIG. 35.

In sum, in a direction which is nearly orthogonal to a turning axis which is configured by the axis supporting portions 6a, 7b, an end portion of the elastic member 8b is disposed at a position which is more distant from the axis supporting portions 6a, 7b than an end portion of the sheet member 8a.

By realizing such configuration, it is possible to prevent the elastic member 8b from contacting the hinge 7, without growing the apparatus in size, by having a document D attached firmly to the document table glass 2 with certainty, and without exerting a bad influence to a read image.

In addition, it also becomes possible to surely carry out document installation in a vertically placed condition.

This application claims priority from Japanese Patent Application No. 2004-379257 filed Dec. 28, 2004, which hereby incorporated by reference herein.

What is claimed is:

1. An image reading apparatus for reading out an image of a document, comprising:

a document table on which a document to be read is placed;

a cover member which covers the document placed in the document table;

a support structure which supports a main body of the image reading apparatus in a vertically placed condition where the document table is placed nearly vertically relative to a resting surface on which the main body is placed; and a storage section which stores the support structure on a bottom portion on the side of the resting surface of the main body in a horizontally placed condition where the document table is placed nearly horizontally relative to the resting surface, wherein the support structure has a supporting portion which is pivotally mounted on the bottom portion and supports the bottom portion of the main body, and a holding portion which holds an end portion of the main body on the side of the resting surface, wherein the support structure includes:

a first pivot member, one end of which is disposed pivotally to the main body;

a second pivot member, one end of which is disposed pivotally to the other end of the first pivot member and which faces the resting surface in the vertically placed condition; and a third pivot member, one end of which is disposed pivotally to the other end of the second pivot member, and a pivotal movement of which is restricted by a restriction portion relative to the second pivot member in a condition where the third pivot member is openable by a predetermined angle, to hold the main body, wherein the supporting portion is configured by the first pivot member, and the holding portion is configured by the second and third pivot members.

2. The image reading apparatus as set forth in claim 1, wherein the first, second, and third members1 which are pivotally coupled in series with each other, are folded in the storage section in the horizontally placed condition.

3. The image reading apparatus as set forth in claim 1, wherein the cover member includes:

a hinge member which is disposed pivotally to the main body and is located on the resting surface side of the main body in the vertically placed condition and has a pivotal axis which is nearly parallel to the resting surface; and a pressing member which is disposed pivotally to the hinge member and presses a document that is placed on the document table, and is located on the opposite side to the resting surface to the hinge member in the vertically placed condition, wherein the holding portion of the support structure restricts a pivotal movement of the hinge member by pressing the hinge member in the vertically placed condition.

4. The image reading apparatus as set forth in claim 3, wherein the support structure includes a high friction member at a portion which contacts the cover member in the vertically placed condition.

5. The image reading apparatus as set forth in claim 4, wherein the support structure is stored in the storage section with at least a part of the portion where the high friction member is disposed contacts the resting surface in the horizontally placed condition.

* * * * *